US010218494B1

(12) United States Patent
de Quehen et al.

(10) Patent No.: US 10,218,494 B1
(45) Date of Patent: Feb. 26, 2019

(54) PERFORMING BLOCK FORM REDUCTIONS MODULO NON-MERSENNE PRIMES IN CRYPTOGRAPHIC PROTOCOLS

(71) Applicant: ISARA Corporation, Waterloo (CA)

(72) Inventors: Victoria de Quehen, Waterloo (CA); Shane Daniel Kelly, Waterloo (CA)

(73) Assignee: ISARA Corporation, Waterloo, Ontario ( * ) Notice: Subject to any disclaimer, the term of this patent is extended or adjusted under 35 U.S.C. 154(b) by 0 days.

(21) Appl. No.: 15/903,944

(22) Filed: Feb. 23, 2018

(51) Int. Cl.
*H04L 29/06* (2006.01)
*H04L 9/06* (2006.01)
*H04L 9/08* (2006.01)

(52) U.S. Cl.
CPC .......... *H04L 9/0618* (2013.01); *H04L 9/0841* (2013.01)

(58) Field of Classification Search
None
See application file for complete search history.

(56) References Cited

U.S. PATENT DOCUMENTS

| | | | | |
|---|---|---|---|---|
| 6,836,869 | B1 * | 12/2004 | Wyland | H03M 13/09 714/781 |
| 2002/0021803 | A1 | 2/2002 | Solinas | |
| 2004/0078414 | A1 * | 4/2004 | Geiringer | H04L 9/3093 708/530 |
| 2004/0078570 | A1 * | 4/2004 | Geiringer | H04L 9/3093 713/165 |
| 2004/0078576 | A1 * | 4/2004 | Geitinger | G06F 7/582 713/181 |
| 2004/0111459 | A1 * | 6/2004 | Stojancic | G11C 7/1006 708/491 |
| 2007/0192303 | A1 * | 8/2007 | Stojancic | G11C 7/1006 |
| 2011/0016167 | A1 * | 1/2011 | Dupaquis | G06F 7/724 708/250 |
| 2011/0116539 | A1 * | 5/2011 | He | G06F 17/147 375/240.2 |
| 2012/0057695 | A1 * | 3/2012 | Lazich | G06F 7/724 380/28 |

OTHER PUBLICATIONS

Hayes, Brian, "Third Base", 2001, American Scientist, vol. 89, No. 6, p. 490-494. (Year: 2001).*

(Continued)

*Primary Examiner* — Jeffery L Williams
(74) *Attorney, Agent, or Firm* — Henry Patent Law Firm PLLC

(57) ABSTRACT

In a general aspect, a cryptography process performs modular operations, where the modulus is a non-Mersenne prime. In some aspects, an integer is obtained during execution of a cryptography protocol defined by a cryptosystem. A prime modulus is defined by the cryptosystem in terms of a set of constants. The set of constants includes at least a first constant and a second, distinct constant. A set of block coefficients is computed to represent the integer in a block form. The plurality of block coefficients includes a first block coefficient obtained by a first modular reduction modulo the first constant, and a second block coefficient obtained by a second modular reduction modulo the second constant. A reduced representation of the integer is computed based on the plurality of block coefficients, such that the reduced representation is less than the prime modulus.

30 Claims, 10 Drawing Sheets

(56) References Cited

OTHER PUBLICATIONS

Bajard, et al., "Efficient RNS Bases for Cryptography", IMACS'05: World Congress: Scientific Computation Applied Mathematics and Simulation, Jul. 2005, p. 1-8. (Year: 2005).*
Sreehari, Suhas, "Fast Modular Reduction for Larg-lnteger Multiplication", 2012, University of Windsor, p. 1-85. (Year: 2012).*
Garg et al., New Residue Arithmetic Based Barret Algorithms, Part I: Modular Integer Computations, 2016, IEEE Access. 4.10.1109/ ACCESS.2016.2599269, p. 1-22. (Year: 2016).*
Bos, et al., "Fast Arithmetic Modulo $2^x p^y \pm 1$", https://eprint.iacr.org/2016/986, 2016, 17 pgs.
Costello, et al., "Efficient algorithms for supersingular isogeny Diffie-Hellman", IACR-CRYPTO-2016; https://eprint.iacr.org/2016/413, 2016, 35 pgs.
De Feo, et al., "Towards quantum-resistant cryptosystems from supersingular elliptic curve isogenies", https://eprint.iacr.org/2011/506, 2011, 25 pgs.
Jao, et al., "Isogeny-based quantum-resistant undeniable signatures", Post-quantum cryptography, 6th Intl Workshop; PQCrypto 2014, Waterloo, ON, Canada, Oct. 1, 2014, 22 pgs.
Jao, et al., "Towards quantum-resistant cryptosystems from supersingular elliptic curve isogenies", PQCrypto'11 Proceedings of the 4th international conference on Post-Quantum-Cryptography, Nov. 29, 2011, 17 pgs.
Karmakar, et al., "Efficient Finite Field Multiplication for Isogeny Based Post Quantum Cryptography", Conference Paper, International Workshop on the Arithmetic of Finite Fields, 2016, 23 pgs.
USPTO, Non-final Office Action dated Aug. 3, 2018, in U.S. Appl. No. 15/903,988, 15 pgs.

\* cited by examiner

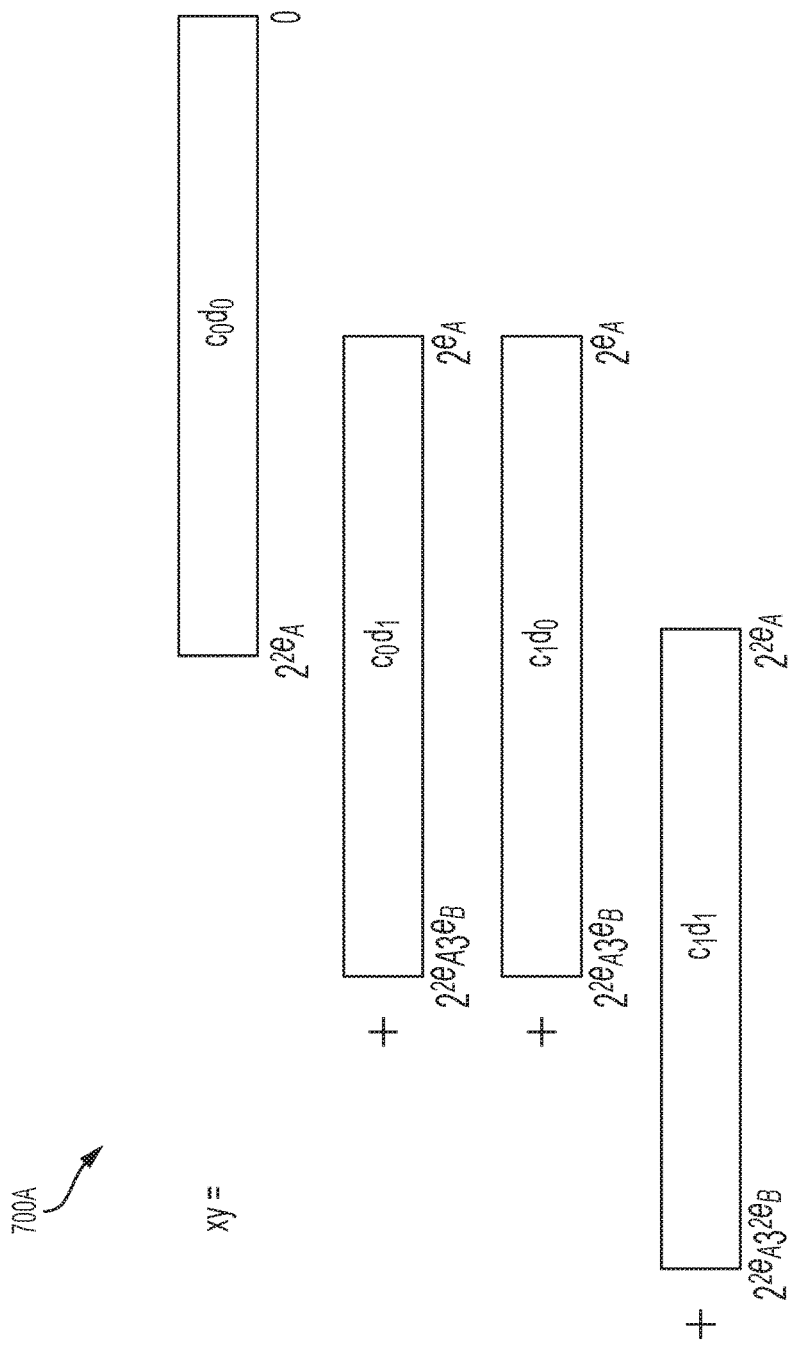

PERFORMING BLOCK FORM REDUCTIONS MODULO NON-MERSENNE PRIMES IN CRYPTOGRAPHIC PROTOCOLS

BACKGROUND

The following description relates to manipulating cryptographic variables modulo non-Mersenne primes, for example, in supersingular isogeny-based cryptography protocols.

Cryptography systems are used to communicate securely over public channels. For example, some cryptography systems provide confidentiality by encrypting messages, and some cryptography systems provide authentication through digital signatures. Some cryptography systems operate using public keys, private keys and shared secrets.

DESCRIPTION OF DRAWINGS

FIGS. 7A-7C are block diagrams showing block coefficients in an example modular multiplication process.

DETAILED DESCRIPTION

Figure 1A:
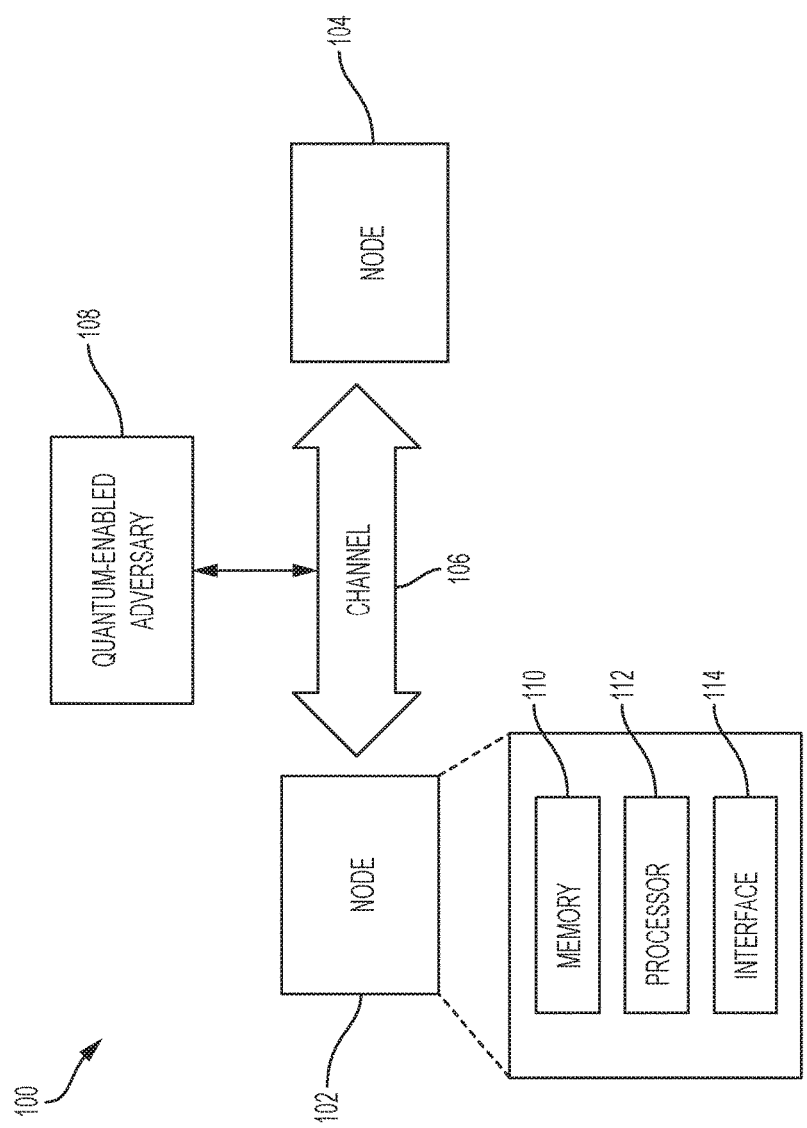
FIG. 1A is a block diagram showing aspects of an example communication system.

In some aspects of what is described, cryptography protocols used for secure communication (e.g., in a computer network or other environment) are improved, for example, by increasing the speed and efficiency of certain types of computations. For example, some cryptosystems rely on modular arithmetic modulo a non-Mersenne prime (i.e., a prime number that is neither a Mersenne prime nor a generalized Mersenne prime), and efficient modular arithmetic with such primes can improve the computational efficiency of such cryptosystems.

For example, supersingular isogeny-based Diffie-Hellman (SIDH) protocols utilize computation modulo non-Mersenne primes of the form $p=1_A^{e_A}1_B^{e_B}f-1$, where $1_A$ and $1_B$ are small primes and f is an integer. An example of an SIDH protocol is described by Jao and De Feo in their publication entitled "Towards quantum-resistant cryptosystems from supersingular elliptic curve isogenies," in *PQCrypto 2011 Proceedings* (pp. 19-34, 2011).

Mersenne primes can have the form $p=2^n-1$, or they may be expressed in the more generalized form $f(2^n)$ where n is an integer and f(x) of is a low-degree polynomial with small integer coefficients. Any prime number that is not a Mersenne prime is referred to as a "non-Mersenne prime." In some examples, certain non-Mersenne primes may be expressed in the form $p=f(1_1^{e_1}, \ldots, 1_k^{e_k})$ or $p=1_1^{e_1}\cdot\ldots\cdot1_k^{e_k}f\pm d$, where each $1_i$ represents a distinct small prime number (for $1 \le i \le k$), each $e_i$ represents a respective integer value for $1 \le i \le k$, and f and d represent integer values. In some examples, certain non-Mersenne primes may be expressed in the form $p=ab\pm d$, where the first constant is a, the second constant is b, the first constant a and the second constant b are small and relatively prime, and d represents an integer value.

In some cryptosystems, modular multiplication in a finite field can be relatively costly (e.g., relative to addition and subtraction) because modular multiplication is linked to the problem of modular reduction. While addition and subtraction are often relatively fast, multiplication is typically more time consuming. For example, although SIDH has relatively small key sizes, it can require more computational power than some other protocols, and a large amount of this computational time is spent on modular arithmetic.

Accordingly, aspects of the systems and techniques described here can be used to improve the operation of communications systems (e.g., data networks, etc.), computer systems (e.g., network-connected computers, etc.), smart devices (e.g., so-called "Internet-of-Things" (IoT) devices, etc.) and other classes of technology. For example, a wide variety of modern technologies rely on computer-implemented cryptosystems for secure operation, and the techniques described here can improve such computer-implemented cryptosystems, for example, making them more computationally efficient or providing other advantages in some instances.

In some implementations, the techniques described here can be used to improve computational efficiency in a supersingular isogeny-based cryptography protocol. For example, the techniques described here can provide a faster process for modular reduction and modular multiplication by taking advantage of the non-Mersenne form of the prime modulus. For instance, in the context of SIDH and other protocols using $p=1_A^{e_A}1_B^{e_B}f-1$, numbers can be written in block form with respect to one of the primes $1_A$ or $1_B$ to provide faster modular arithmetic. In some cases, numbers can be converted between representations in base $1_A$ and base $1_B$ to provide additional computational efficiency. Having a faster modular reduction can also speed up modular multiplication and possibly other operations. The techniques described here may also provide technical advantages in other types of cryptosystems.

In some of the examples described here (e.g., in the examples shown in FIGS. 4, 5, and 7A-7C), a prime of the form $p=1_A^{e_A}1_B^{e_B}f-1$ is considered, and a block representation is used to simplify the modular reduction. For example, by first dividing one block by $1_A^{e_A}$, and then dividing another block by $1_B^{e_B}$, the result is that smaller blocks are divided by $1_A^{e_A}$ and $1_B^{e_B}$, where both $1_A^{e_A}$ and $1_B^{e_B}$ have half as many bits as p. In some examples, these smaller blocks will have ¾ the bits that z has. In some of the examples described here, the parameter values $1_A=2$ and $1_B=3$ (such that $p=2^{e_A}3^{e_B}f-1$) are considered, which may find application in some supersingular isogeny-based cryptosystems. However, the techniques described here can be applied to other values of $1_A$ and $1_B$, as well as other forms of the prime p.

In some examples, modular reduction can be applied to integer z in $F_p$, where z has a representation of the form $0 \le z < p^2$. Here, let $F_p$ denote the finite field containing p elements. If the finite field has characteristic p, then arithmetic in the finite field amounts to doing arithmetic modulo p. The modular reduction process finds another representation of z in $F_p$, where z has a representation of the form $0 \le z < p$. When a cryptography protocol is executed, integers generated by the protocol (e.g., the products of two numbers) can be reduced to a number between 0 and p. In some cases, the elements in the field $F_p$ can be expressed in terms of a power of one of the primes to speed up multiplication modulo p. For instance, element $0 \leq z < p^2$ can be expressed in the form $g(1_A^{e_A}, 1_B^{e_B})$, where $g(x_1, x_2)$ is a low-degree polynomial, in order to speed up the modular reduction. In some examples, z has a representation of the form $0 \leq z < kp^2$, where k is a small constant.

In some implementations, block coefficients are computed by performing modular reductions to relevant blocks modulo smaller the constants (e.g., $1_A^{e_A}$ and $1_B^{e_B}$) that are smaller than the main prime (e.g., $p=1_A^{e_A}1_B^{e_B}f-1$) that defines the field. The block coefficients may be computed in hardware or software. In some cases, Barrett reduction or Montgomery reduction can be used to compute the block coefficients by performing modular reductions modulo the smaller constants (e.g., $1_A^{e_A}$ and $1_B^{e_B}$).

In some examples, Karatsuba's algorithm can be used to perform modular reductions modulo the smaller the constants (e.g., $1_A^{e_A}$ and $1_B^{e_B}$). Karatsuba's algorithm can use only three multiplications instead of four multiplications. Karatsuba's algorithm can operate, for example, by expressing $x = c_0 + c_1 2^{e_A}$, where $0 \leq c_0 < 2^{e_A}$ and $0 \leq c_1 < 3^{e_B}$, and expressing $y = d_0 + d_1 2^{e_A}$, where $0 \leq d_0 < 2^{e_A}$ and $0 \leq d_1 < 3^{e_B}$. With these expressions, we find $xy = c_0 d_0 + (c_0 d_1 + c_1 d_0 + c_1 d_1 2^{e_A}) 2^{e_A}$. Let $z_0 = c_0 d_0$, $z_1 = c_0 d_1 + c_1 d_0$, and $z_2 = c_1 d_1$. As $c_0 d_1 + c_1 d_0 = z_1 - z_0 - z_2$, one can find $xy = z_0 + (z_1 - z_0 - z_2 + Z_2 2^{e_A}) 2^{e_A}$. The modular reductions modulo the smaller constants (e.g., $1_A^{e_A}$ and $1_B^{e_B}$) can be performed in another manner.

In some implementations, additional efficiency can be gained by converting between number systems. For example, when the prime p can be described in terms of the two primes 2 and 3, it can be useful to convert between binary and ternary representations to speed up modular reduction and modular multiplication. For instance, when numbers are represented in binary memory, reducing modulo $2^{e_A}$ can be performed by parsing the binary memory. Similarly, when numbers are represented in ternary memory, reducing modulo $3^{e_A}$ can be performed by parsing the ternary memory. The speed-up by employing conversion between binary and ternary (or more generally between base $1_A^{e_A}$ and base $1_B^{e_B}$) may be more pronounced in a certain hardware implementations, for instance, where conversions between binary and ternary can be done efficiently. Moreover, representing a number modulo $1_A^i 1_B^j$, where $i < 1_A^{e_A}$ and $j < 1_B^{e_B}$, may speeds up converting between base $1_A$ and $1_B$, and as well as speeding up division by $1_A^{e_A}$ and $1_B^{e_B}$. For example, instead of representing elements in binary, and then switching to ternary, representing elements could be represented in base 6 could make the conversion between binary and ternary easier.

In some cases, the techniques described here can be applied to cryptosystems where operations are performed modulo a prime number of the form $p = ab \pm d$, where a and b are relatively prime, and d is a small number. In some cases, the techniques described here can be applied to cryptosystems where operations are performed modulo a prime number of the form the form $f(1_1^{e_1}, \ldots, 1_k^{e_k})$, where $k \geq 2$ and $f(x_1, \ldots, x_k)$ is a low-degree polynomial with small integer coefficients.

In some cases, the techniques described here can be applied to cryptosystems in which certain operations are performed with a modulus that is a prime number of the form $p = 1_1^{e_1} \cdot \ldots \cdot 1_k^{e_k} f \pm d$, where $k \geq 2$, and $1_1 \ldots 1_k$ are small primes, and d and f are small numbers. An example of where this may be applicable is in the signature scheme described by Jao and Soukharev in their publication entitled "Isogeny-based quantum-resistant undeniable signatures," in *International Workshop on Post-Quantum Cryptography* (pp. 160-179, Springer, Cham, 2014). In this signature scheme, the authors use primes of the form $1_A^{e_A} 1_C^{e_C} 1_M^{e_M} f \pm 1$, for three small primes $1_A$, $1_C$ and $1_M$. In such cases, any number z can be represented in the block form of the form $g(1_1^{e_1}, \ldots, 1_k^{e_k})$, where $g(x_1, \ldots, x_k)$ is a low-degree polynomial to allow multiplication to be computed in blocks. Additionally, calculating specific blocks modulo $1_i^{e_i}$ may become easier if the number is represented base $1_i$. Moreover, a parameter regime where $1_1^{e_1} \cdot \ldots \cdot 1_k^{e_k} f \mp d$ in $F_p$ can be used to give a representation of xy that is between 0 and p.

In some cases, the techniques described here can be used to perform a so-called "lazy modular reduction." For example, lazy modular reduction may be used to obtain a representation of a number z in the form $0 \leq z < kp$, for some small multiple kp of p. Similarly, lazy modular multiplication may be used to obtain a representation of a number xy in the form $0 \leq xy < kp$, for some small multiple kp of p.

FIG. 1 is a block diagram showing aspects of an example communication system 100. The example communication system 100 shown in FIG. 1 includes two nodes 102, 104. The nodes 102, 104 use a supersingular isogeny-based cryptosystem to communicate with each other over a channel 106. The nodes 102, 104 represent distinct entities in the cryptosystem.

In the example shown, a quantum-enabled adversary 108 has access to the channel 106, information exchanged on the channel 106, or both. In some instances, the quantum-enabled adversary 108 can transmit or modify information on the channel 106. The communication system 100 may include additional or different features, and the components in a communication system may be configured to operate as shown in FIG. 1 or in another manner.

In some implementations, nodes in the communication system 100 may have a server-client relationship. For example, the node 102 can be a server and the node 104 can be its client, or vice-versa. In some implementations, nodes in the communication system 100 may have a peer-to-peer relationship. For example, the nodes 102, 104 can be peers in a served network, in a peer-to-peer network or another type of network. Nodes may have another type of relationship in the communication system 100.

In the example shown in FIG. 1, the example nodes 102, 104 each have computational resources (e.g., hardware, software, firmware) that are used to communicate with other nodes. In some implementations, nodes in the communication system 100 can be implemented in various systems, such as, for example, laptops, desktops, workstations, smartphones, tablets, personal digital assistants, servers, server clusters, mainframes, IoT devices, and other types of computer systems. As shown in FIG. 1, the example node 102 includes a memory 110, a processor 112, and an interface 114. Each of the nodes 102, 104 may include the same, additional or different components. The nodes 102, 104 may be configured to operate as shown and described with respect to FIG. 1 or in another manner.

Figure 1B:
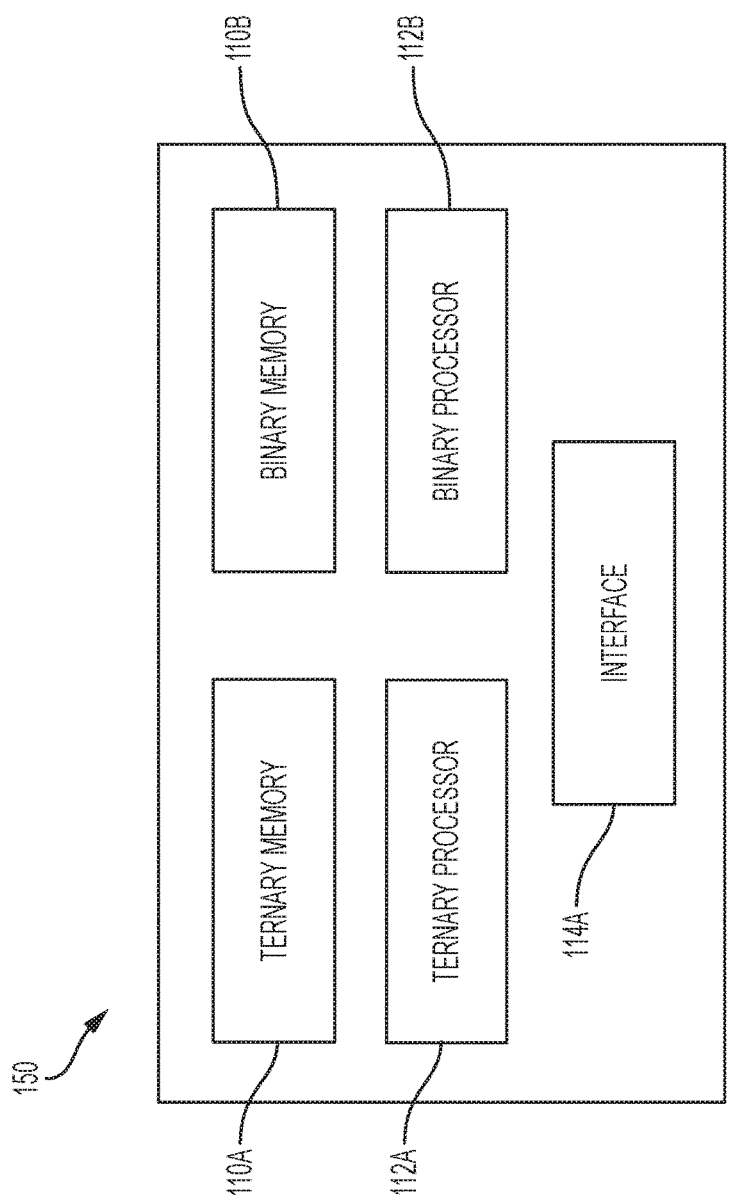
FIG. 1B is a block diagram showing aspects of an example computer system.

In some cases, one or both of the nodes 102, 104 includes may include features of the example computer system 150 shown in FIG. 1B, or the nodes 102, 104 may include different features. For example, the memory 110 in FIG. 1A may include a binary memory, a ternary memory, or a combination of these and other types of memory; and the processor 112 may include a binary processor, a ternary processor or a combination of these and other types of processors.

In the example shown in FIG. 1, an entity represented by either of the nodes 102, 104 may correspond to a computing device, a computer system, an IP address or other network address, or another type of computer-readable identifier or instance of a computer resource. Accordingly, the computations and other operations of each entity may be performed by one or more processors or other elements of the respective node 102, 104. Similarly, information sent to or received by an entity may be sent to or received by an element (e.g., one or more processors, memories, or interfaces) of the respective node 102, 104.

The example memory 110 can include, for example, random access memory (RAM), a storage device (e.g., a writable read-only memory (ROM) or others), a hard disk, or another type of storage medium. The example memory 110 can store instructions (e.g., computer code, a computer program, etc.) associated with an operating system, computer applications and other resources. The memory 110 can also store application data and data objects that can be interpreted by one or more applications or virtual machines running on the node 102. The node 102 can be preprogrammed, or it can be programmed (and reprogrammed), by loading a program from another source (e.g., from a DVD-ROM, from a removable memory device, from a remote server, from a data network or in another manner). In some cases, the memory 110 stores computer-readable instructions for software applications, scripts, programs, functions, executables or other modules that are interpreted or executed by the processor 112. For example, the computer-readable instructions can be configured to perform one or more of the operations shown in one or more of FIGS. 2, 3, 4, 5, 6 and 7A-7C.

In the example node 102 shown in FIG. 1, the processor 112 is a data processing apparatus that can execute instructions, for example, to generate output data based on data inputs. For example, the processor 112 may run computer programs by executing or interpreting the software, scripts, programs, functions, executables, or other modules stored in the memory 110. In some instances, the processor 112 may perform one or more of the operations shown in FIG. 2.

The example processor 112 shown in FIG. 1 can include one or more chips or chipsets that include analog circuitry, digital circuitry or a combination thereof. In some cases, the processor 112 includes multiple processor devices such as, for example, one or more main processors and one or more co-processors. For instance, the processor 112 may include a main processor that can delegate certain computational tasks to a cryptographic co-processor, which may be configured to perform the computational tasks more efficiently than the main processor or in parallel with other computational tasks performed by other processor devices. In some instances, the processor 112 coordinates or controls operation of other components of the node 102, such as, for example, user interfaces, communication interfaces, peripheral devices and possibly other components.

In the example node 102 shown in FIG. 1, the interface 114 provides communication with other nodes (e.g., via channel 106). In some cases, the interface 114 includes a wireless communication interface that provides wireless communication using a wireless protocol or standard. For example, the interface 114 may provide wireless communication via Bluetooth, Wi-Fi, Near Field Communication (NFC), CDMA, TDMA, PDC, WCDMA, CDMA2000, GPRS, GSM, or other forms of wireless communication. Such communication may occur, for example, through a radio-frequency transceiver or another type of component. In some cases, the interface 114 includes a wired communication interface (e.g., USB, Ethernet) that can be connected to one or more input/output devices, such as, for example, a keyboard, a pointing device, a scanner, or a networking device such as a switch or router, for example, through a network adapter.

The example channel 106 can include all or part of a connector, a data communication network or another type of communication link. For example, the channel 106 can include one or more wired or wireless connections, one or more wired or wireless networks or other communication channels. The channel 106 may have any spatial distribution. The channel 106 may be public, private, or include aspects that are public and private. For instance, in some examples, the channel 106 includes one or more of a Local Area Network (LAN), a Wide Area Network (WAN), a Virtual Private Network (VPN), the Internet, a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

In the example shown, the quantum-enabled adversary 108 is a node in the communication system 100 that has access to quantum computational resources. For example, the quantum-enabled adversary 108 can be, include, or have access to a quantum computer, a quantum information processor, a quantum memory, a quantum communication interface or a combination of these and possibly other quantum technologies. In some implementations, the quantum-enabled adversary 108 can include a hybrid computing system, for instance, that includes a quantum processor driven by a classical front end processor, or another type of hybrid computing system.

In some examples, the quantum-enabled adversary 108 can store and process information in a quantum system. For instance, the quantum-enabled adversary 108 may encode information as quantum bits ("qubits") and process the information by manipulating the qubits. The information may be encoded in physical qubits, logical qubits, or a combination of these and other types of qubit encodings. In some implementations, the quantum-enabled adversary 108 can operate in a fault-tolerant regime, or the quantum-enabled adversary may operate below the fault-tolerant regime.

Many public key cryptography systems ("cryptosystems") are known to be insecure against an attacker armed with a scalable quantum computer. For example, the Diffie-Hellman (DH) and elliptic curve Diffie-Hellman (ECDH) key agreement protocols are vulnerable to certain types of attacks by quantum-enabled adversaries. The threat of quantum computers to public key cryptography can be mitigated by switching to other public key cryptography systems that are believed to be invulnerable to quantum attack. For example, supersingular isogeny-based protocols have been proposed as a quantum-resistant replacement for contemporary key agreement protocols such as the Diffie-Hellman (DH) and elliptic curve Diffie-Hellman (ECDH).

In some implementations, the example quantum-enabled adversary 108 can perform quantum computing algorithms, execute quantum computing circuits or quantum communication protocols, or perform other types of quantum information processing tasks. In the example shown, the quantum-enabled adversary 108 can perform Shor's algorithm, which allows the quantum-enabled adversary to efficiently solve problems that are believed to be hard on a classical computer. For example, the quantum-enabled adversary 108 may use Shor's algorithm to factor large integers, find discrete logarithms or possibly to solve other problems in a computationally-efficient manner. Accordingly, the example quantum-enabled adversary 108 can compromise the security of certain quantum-vulnerable cryptography systems (e.g., by computing a private key of a certificate authority or other entity based on public information).

The example quantum-enabled adversary 108 shown in FIG. 1 can access information exchanged on the channel 106. For example, the quantum-enabled adversary 108 may access some or all of the information exchanged between the nodes 102, 104. In some instances, the quantum-enabled adversary 108 can directly observe correspondence on the channel 106; in some instances, the quantum-enabled adversary 108 indirectly obtains such correspondence, for example, by receiving information observed on the channel 106 by another entity or system.

In some implementations, the quantum-enabled adversary 108 can factor integers, compute discrete logarithms, or perform other classically-hard computational tasks fast enough to compromise the security of certain cryptography systems. For example, the quantum-enabled adversary 108 may be capable of computing prime factors fast enough to compromise certain RSA-based cryptography systems or computing discrete logarithms fast enough to compromise certain ECC-based cryptography systems.

In the example shown in FIG. 1, the nodes 102, 104 may use a quantum-resistant cryptography system that cannot be compromised by the example quantum-enabled adversary 108. For instance, the nodes 102, 104 may use a cryptography system that is secure against a quantum computer that can efficiently execute Shor's algorithm or other types of algorithms that are known to compromise the security of certain conventional cryptography standards.

In some implementations, the nodes 102, 104 use a digital signature scheme that allows each node to verify the authenticity of messages received from the other node, and the digital signature scheme can be a quantum-resistant scheme that is not vulnerable to the quantum computing resources of the quantum-enabled adversary 108. In some implementations, the nodes 102, 104 use an encryption scheme that allows each node to send confidential messages to the other node, and the encryption scheme can be a quantum-resistant scheme that is not vulnerable to the quantum computing resources of the quantum-enabled adversary 108. Such digital signature schemes and encryption schemes can include or be used in conjunction with a key agreement protocol or a key encapsulation mechanism that is also secure against attacks by the quantum-enabled adversary 108. In some examples, the nodes 102, 104 can use the example techniques shown in FIG. 2, or the nodes 102, 104 may use variations of these and other techniques to communicate securely on the channel 106.

FIG. 1B is a block diagram showing aspects of an example computer system 150. In some cases, aspects of the example computer system 150 in FIG. 1B may be used in the communication system 100 shown in FIG. 1A, for instance, to implement aspects of one or both of the nodes 102, 104.

The example computer system 150 includes a ternary memory 110A, a binary memory 110B, a ternary processor 112A, a binary processor 112B and an interface 114. The computer system 150 may include additional or different components.

The example binary memory 110B and the example binary processor 112B in FIG. 1B can generally operate as described above with respect to the example memory 110 and the example processor 112 shown in FIG. 1A, storing and processing information in binary format. In some instances, the computer system 150 stores and processes variables (e.g., representing numbers and other information) in a binary format, and the binary representation of a variable may be encoded in the binary memory 110B. In a binary format, the specific value of the variable is represented in a base-2 number system (as bits), where each bit assumes one of two binary values (e.g., 0 or 1). The binary memory 110B can include memory blocks that each store several bits. In some cases, variables are represented as bit strings that are stored in an ordered array of memory locations in the binary memory 110B. The binary processor 112B can process information stored in the binary memory 110B.

The example ternary memory 110A and the example ternary processor 112A in FIG. 1B can generally operate as described above with respect to the example memory 110 and the example processor 112 shown in FIG. 1A, storing and processing information in ternary format. In some instances, the computer system 150 stores and processes variables (e.g., representing numbers and other information) in a ternary format, and the ternary representation of a variable may be encoded in the ternary memory 110A. In a ternary format, the specific value of the variable is represented in a base-3 number system (as trits), where each trit assumes one of three ternary values (e.g., 0, 1 or 2). The ternary memory 110A can include memory blocks that each store several trits. In some cases, variables are represented as trit strings that are stored in an ordered array of memory locations in the ternary memory 110A. The ternary processor 112A can process information stored in the ternary memory 110A.

In some implementations, the computer system 150 includes computing resources that convert variables between representations in two distinct number systems. For example, the computer system 150 may include a processor that converts numbers between a binary representation and a ternary representation (from binary to ternary, from ternary to binary, or both). In some cases, a microprocessor can be programmed by software to convert numbers and other types of variables between a binary representation and a ternary representation. For instance, the binary processor 112B may be implemented as a general purpose microprocessor, and it may execute software that can convert between binary and ternary. In some cases, the computer system 150 includes specialized hardware programmed to convert numbers and other types of variables between a binary representation and a ternary representation. For instance, the computer system 150 may include an FPGA (field programmable gate array) or an ASIC (application specific integrated circuit) programmed to convert numbers and other types of variables between a binary representation and a ternary representation.

In some instances, one or more of the binary computing resources (e.g., the binary memory 110B and the binary processor 112B) communicates with one or more of the ternary computing resources (e.g., the ternary memory 110A and the ternary processor 112A). For example, in some protocols, it may be useful to perform some computations in binary and to perform other computations in ternary. For instance, as described with respect to FIGS. 4, 5 and 7A-7C, certain division and reduction operations may be performed faster in certain types of hardware. As an example, division or reduction by $2^n$ (where n is any positive integer) can be done quickly in binary hardware, for instance, by parsing the n least significant bits (the remainder) from the remaining bits (the quotient) in a binary representation of the dividend. As another example, division or reduction by $3^m$ (where m is any positive integer) can be done quickly in ternary hardware, for instance, by parsing the m least significant trits (the remainder) from the remaining trits (the quotient) in a ternary representation of the dividend.

Figure 2:
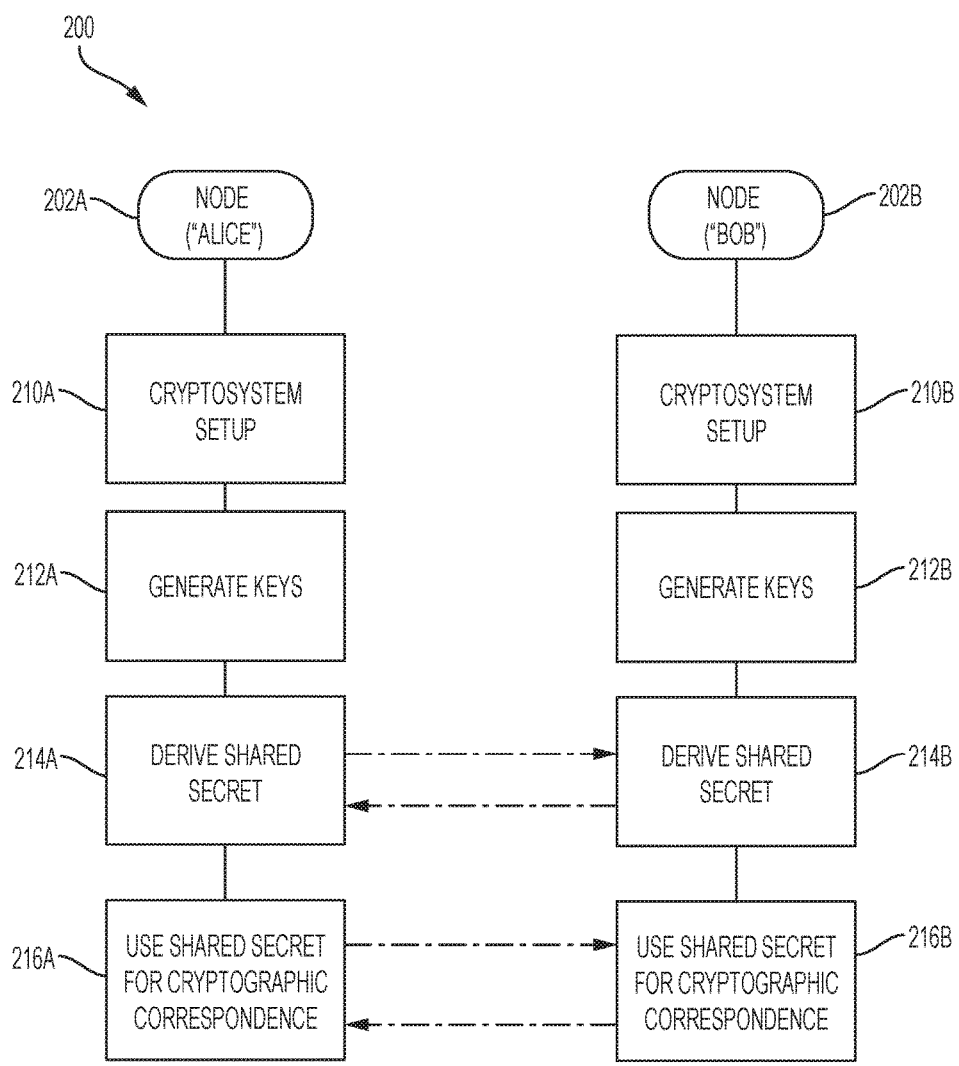
FIG. 2 is a flow diagram showing aspects of an example cryptographic process.

FIG. 2 is a flow diagram showing aspects of an example cryptographic process 200. The example cryptographic process 200 can be performed, for example, by computer systems that can exchange information over a communication channel. For instance, operations in the cryptographic process 200 may be performed by the nodes 102, 104 in the example communication system 100 shown in FIG. 1 or in another type of system. The example process 200 may include additional or different operations, including operations performed by additional or different entities, and the operations may be performed in the order shown or in another order.

In some cases, one or more of the operations shown in FIG. 2 are implemented as processes that include multiple operations, sub-processes or other types of routines. In some cases, operations can be combined, performed in parallel, iterated or otherwise repeated or performed in another manner.

The example process 200 shown in FIG. 2 includes operations performed by nodes 202A, 202B. In the example shown, the nodes 202A, 202B represent two distinct entities in a supersingular isogeny-based cryptosystem. The two distinct entities are referred to as "Alice" and "Bob" in FIG. 2. In the example shown, the nodes 202A, 202B exchange public data, and each node uses the public data provided by the other node to execute the process 200. In some cases, the nodes 202A, 202B may have a server-client relationship, a peer-to-peer relationship or another type of relationship. The nodes 202A, 202B may communicate with each other, for example, directly or indirectly, in each stage of the process 200.

In the example shown in FIG. 2, each entity may correspond to a computing device, a computer system, an IP address or other network address, or another type of computer-readable identifier or instance of a computer resource. Accordingly, the computations and other operations of each entity may be performed by one or more processors or other elements of the respective node 202A, 202B. Similarly, information sent to or received by an entity may be sent to or received by an element (e.g., one or more processors, memories, or interfaces) of the respective node 202A, 202B.

In some examples, the cryptographic process 200 is secure against quantum-enabled adversaries such as, for example, the quantum-enabled adversary 108 shown in FIG. 1. For instance, in some cases, the example cryptographic process 200 is secure against certain types of attacks or other processes that can be performed by a quantum-enabled adversary who has access to public information exchanged between the server 202 and the client 204. The example cryptographic process 200 may also provide security against classically-enabled adversaries who do not have access to quantum computers or other quantum resources.

At 210A and 210B, the nodes 202A, 202B perform one or more cryptosystem setup operations. A supersingular isogeny-based cryptosystem can be described in terms of a supersingular elliptic curve E defined over a finite field $F_{p^2}$. Let $p \geq 5$ be a prime integer; let $F_{p^2}$ denote a finite field of characteristic p with $p^2$ elements; and let E be an elliptic curve defined over $F_{p^2}$. The cryptosystem setup operations at 210A, 210B can include defining the prime integer $p=l_A^n l_B^m f \pm 1$, where $l_A$ and $l_B$ are distinct prime integers, where f, n, and m are positive integers with f being coprime to $l_A$ and $l_B$, such that $l_A^n \approx l_B^m$. In some examples described here, $l_A=2$ and $l_B=3$, and $p=2^n 3^m f-1$, with f being coprime to 2 and 3, such that $2^n \approx 3^m$. In such examples, the elliptic curve E has $(2^n 3^m f)^2$ points.

The cryptosystem setup operations at 210A, 210B can include defining elliptic curve points $P_A$, $Q_A$, $P_B$, $Q_B$ on the elliptic curve E. For each elliptic curve point, a pair of numbers in the finite field $F_{p^2}$ can represent the x-coordinate and the y-coordinate. For instance, each coordinate can be expressed A+i*B for some integers A and B between 0 and p. Therefore, each elliptic curve point can be represented by four integers between 0 and p.

In examples where $l_A=2$ and $l_B=3$, $\{P_A, Q_A\}$ represents a basis of the set of $2^n$-torsion points $E[2^n]$, and $\{P_B, Q_B\}$ represents a basis of the set of $3^m$-torsion points $E[3^m]$; the order of elliptic curve points $P_A$ and $Q_A$ is $2^n$; and the order of elliptic curve points $P_B$ and $Q_B$ is $3^m$. The global system parameters p, E, $P_A$, $Q_A$, $P_B$, $Q_B$, p, $l_A$, $l_B$, f, n and m, which define a supersingular isogeny cryptosystem, can be published to, computed by, or otherwise made available to the nodes 202A, 202B. When a cryptography protocol is executed with these parameters, one of the entities works over a first set of elliptic curve points defined by $l_A^n$ (e.g., E$[2^n]$), and the other entity works over a second set of elliptic curve points defined by $l_B^m$ (e.g., $E[3^m]$). For example, Alice and Bob may agree that Alice will work over the set E $[2^n]$ and Bob will work over the set E $[3^m]$, or vice versa.

At 212A and 212B, the nodes 202A, 202B perform one or more operations to each generate a respective key pair. In some implementations, each respective node 202A, 202B produces a public-private key pair. For instance, a first public-private key pair for the first entity ("Alice") may be produced at 212A, and a second public-private key pair for the second entity ("Bob") may be produced at 212B. A public-private key pair of an entity includes a private key and a corresponding public key, which are related as prescribed by the cryptosystem. The private key is kept as a secret of the entity, while the public key can be published to other entities in the cryptosystem. In some examples, key derivation processes described by Jao and De Feo in their publication entitled "Towards quantum-resistant cryptosystems from supersingular elliptic curve isogenies," in *PQCrypto* 2011 *Proceedings* (pp. 19-34, 2011) may be adapted to generate key pairs at 212A and 212B, or another technique may be used.

At 214A and 214B, the nodes 202A, 202B perform one or more operations to derive a shared secret. In some implementations, the nodes 202A, 202B produce a shared secret value that can subsequently be used for cryptographic correspondence. For instance, deriving the shared secret at 214A, 214B may produce a secret value that is known to both entities (Alice and Bob), but is not publicly known or easily derivable from public information. In some example protocol, the shared secret is a j-invariant value computed based on image curves exchanged between the entities. In some examples, processes described by Jao and De Feo in their publication entitled "Towards quantum-resistant cryptosystems from supersingular elliptic curve isogenies," in *PQCrypto* 2011 *Proceedings* (pp. 19-34, 2011) may be adapted to generate the shared secret at 214A and 214B, or another technique may be used.

At 216A and 216B, the shared secret (generated at 214A and 214B) is used for cryptographic correspondence. For example, the shared secret may be used in a supersingular isogeny-based cryptography protocol to encrypt or decrypt a message, to sign or verify a message or to generate other parameters that are used for cryptographic correspondence. The values may be used in another manner.

In the example shown in FIG. 2, the nodes 202A, 202B may execute cryptography protocols that require or otherwise utilize certain modular arithmetic operations. For example, a key generation protocol (at 212A, 212B), a shared secret derivation protocol (at 214A, 214B), an encryption/decryption protocol (at 216A, 216B), or a signing/verifying protocol (at 216A, 216B) may divide or reduce an integer by a prime modulus ($p=2^n 3^m f-1$ in the example shown); or they may perform modular multiplication of two integers using a prime modulus ($p=2^n 3^m f-1$ in the example shown). As a specific example, supersingular isogeny-based Diffie-Hellman (SIDH) protocols utilize modular arithmetic during the calculation of the image of an isogeny and the images of elliptic curve points. For instance, image curves and images of points may be computed in an SIDH protocol using an analogue of Velu's formulas, and modular arithmetic (e.g., multiplication and addition) in the finite field may be utilized in such computations. In some implementations, the cryptographic process 200 can be performed more efficiently (e.g., faster, using less processor time, etc.) by using the techniques described below. For instance, either of the nodes 202A, 202B may perform modular reduction using the example process 300 shown in FIG. 3, or modular multiplication using the example process 600 shown in FIG. 6.

Figure 3:
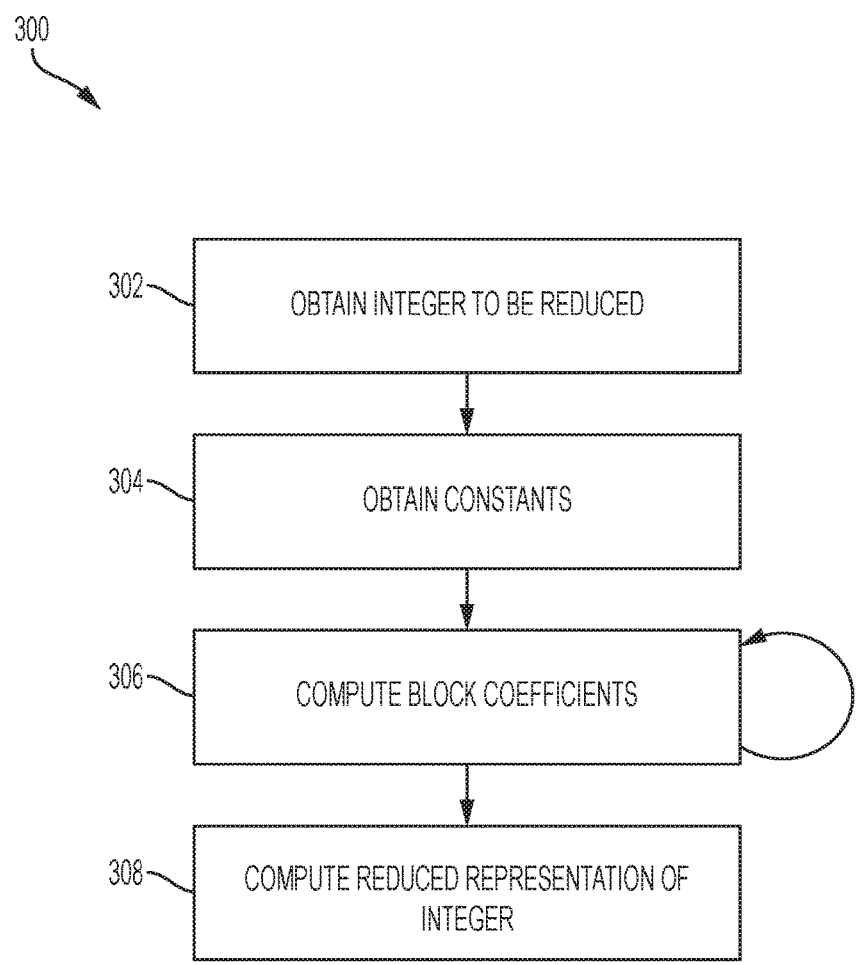
FIG. 3 is a flow diagram showing an example technique for modular reduction.

FIG. 3 is a flow diagram showing an example process 300 for modular reduction. The example process 300 can be performed, for example, by a computer system that includes a memory and a processor. For instance, operations in the process 300 may be performed by either of the nodes 102, 104 in the example communication system 100 shown in FIG. 1 or in another type of system. In some cases, the example process 300 can be performed or utilized as part of a cryptography protocol (e.g., by an entity performing a key agreement protocol) or in another type of process defined by a cryptosystem.

In some examples, the process 300 is executed in the context of a supersingular isogeny-based cryptography protocol. For example, the process 300 may be used to perform modular reduction in a supersingular isogeny-based key agreement protocol (e.g., SIDH or another isogeny-based key agreement protocol), a supersingular isogeny-based key encapsulation mechanism (KEM) protocol, a supersingular isogeny-based encryption protocol, a supersingular isogeny-based decryption protocol, a supersingular isogeny-based signature protocol, a supersingular isogeny-based verification protocol, or another type of supersingular isogeny-based protocol.

The example process 300 may include additional or different operations, and the operations may be performed in the order shown or in another order. In some cases, one or more of the operations shown in FIG. 3 are implemented as processes that include multiple operations, sub-processes for other types of routines. In some cases, operations can be combined, performed in another order, performed in parallel, iterated or otherwise repeated or performed in another manner.

At 302, an integer to be reduced is obtained. For example, the integer may be computed by a processor, received from memory or another source, or the integer may be obtained in another manner. In the example shown in FIG. 3, the integer is obtained during the execution of a cryptography protocol (e.g., as the output of a multiplication or other operation), and is identified to be reduced by a prime modulus defined by the cryptosystem. For example, the prime modulus can represent a prime characteristic of a finite field defined by a supersingular isogeny-based cryptosystem.

At 304, constants are obtained. For example, the constants may be computed by a processor, received from memory or another source, or the constants may be obtained in another manner. In the example shown in FIG. 3, the prime modulus is defined by the cryptosystem in terms of a set of constants, and the set of constants includes a first constant and a second constant, and possibly other constants. For example, the prime modulus may have the form $p=f(l_1^{e_1}, \ldots, l_k^{e_k})$ or $p=l_1^{e_1} \cdot \ldots \cdot l_k^{e_k} f \pm d$, where each $l_i$ represents a distinct prime for $1 \leq i \leq k$, each $e_i$ represents a respective integer value for $1 \leq i \leq k$, the set of constants is the set $\{l_i^{e_i}\}$ for $1 \leq i \leq k$, the first constant is $l_1^{e_1}$, and the second constant is $l_2^{e_2}$. As another example, the prime modulus can have the form $p=ab \pm d$, where the first constant is a, the second constant is b, the first constant a and the second constant b are relatively prime, and d represents an integer value. In the examples shown in FIGS. 4 and 5, the prime modulus has the form $p=2^{e_A} 3^{e_B} f \pm d$.

The constants obtained at 304 are integer values, which are used at 306 to compute block coefficients. In the examples shown in FIGS. 4 and 5, the constants $2^{e_A}$ and $3^{e_B}$ are used compute block coefficients. In some cases, the constants obtained at 304 include some or all of the constants that are used to define the prime modulus. For example, the set of constants $\{l_i^{e_i}\}$ or $\{a, b\}$ may be obtained.

At 306, block coefficients are computed. In some cases, the block coefficients are computed using the techniques shown in FIG. 4 or FIG. 5, or the block coefficients may be computed in another manner.

Computing the block coefficients may include performing one or more reductions modulo each of the constants obtained at 304. For example, when the prime modulus has the form $p=f(l_1^{e_1}, \ldots, l_k^{e_k})$ or $p=l_1^{e_1} \cdot \ldots \cdot l_k^{e_k} f \pm d$, computing the block coefficients may include performing at least one reduction modulo each value of $l_i^{e_i}$ (for $1 \leq i \leq k$). In the examples shown in FIGS. 4 and 5 (where $k=2$), at least one reduction is performed modulo $2^{e_A}$ and at least one reduction is performed modulo $3^{e_B}$.

Figure 4:
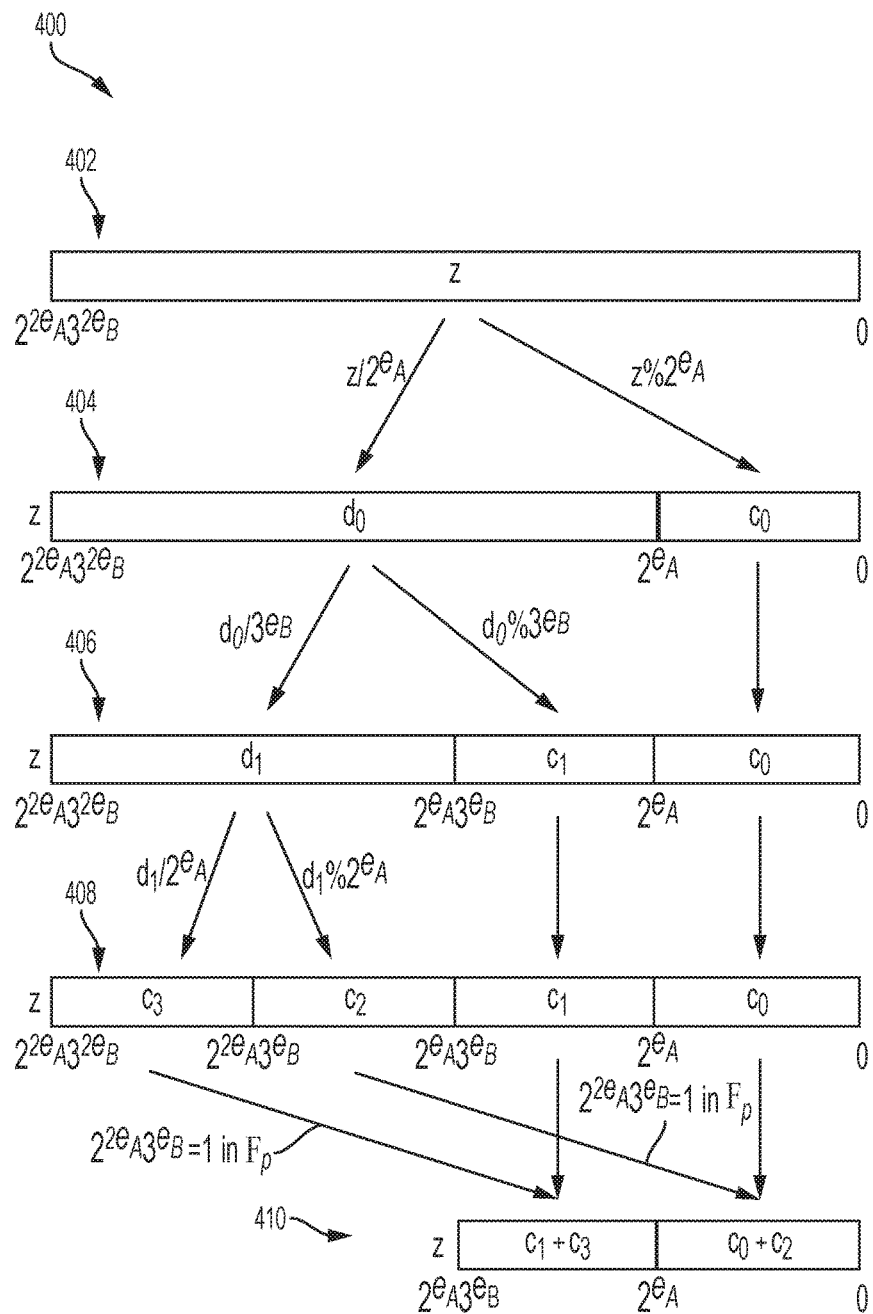
FIG. 4 is a block diagram showing block coefficients in an example modular reduction process.
Figure 5:
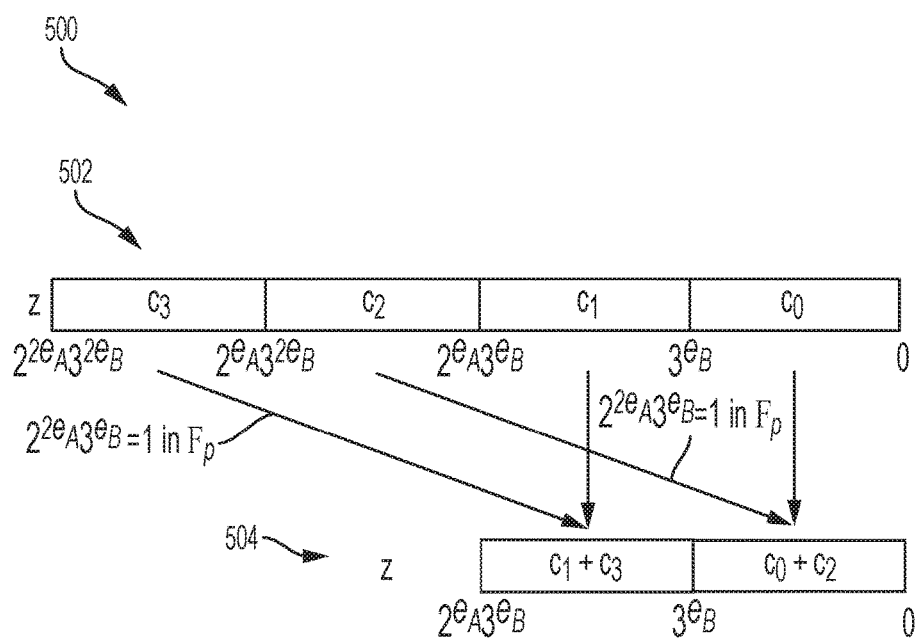
FIG. 5 is a block diagram showing block coefficients in another example modular reduction process.

In the example shown in FIG. 3, the block coefficients are computed at 306 to represent the integer (obtained at 302) in block form. For instance, the set of block coefficients $c_0, c_1, c_2, c_3$ shown in FIGS. 4 and 5 are computed to represent the integer z in block form. In those examples, the block coefficients $d_0, c_0, c_2$ and $c_3$ are each obtained by modular reductions modulo a first constant ($2^{e_A}$ in FIG. 4; $3^{e_B}$ in FIG. 5), while the block coefficients $d_1$ and $c_1$ are each obtained by modular reductions modulo a second constant ($3^{e_B}$ in FIG. 4; $2^{e_A}$ in FIG. 5). In the example shown in FIG. 4, a first block coefficient $c_0$ is a remainder obtained by performing a first modular reduction modulo the first constant $2^{e_A}$; and a second block coefficient $c_1$ is a remainder obtained by performing the second modular reduction modulo the second constant $3^{e_A}$. In the example shown in FIG. 5, a first block coefficient $c_0$ is a remainder obtained by performing a first modular reduction modulo the first constant $3^{e_B}$; and a second block coefficient $c_1$ is a remainder obtained by performing the second modular reduction modulo the second constant $2^{e_A}$.

In some implementations, one or more of the modular reductions to obtain block coefficients at 306 is performed by division. For example, reduction modulo $2^{e_A}$ can be performed by dividing by $2^{e_A}$ and obtaining the remainder, and reduction modulo $3^{e_B}$ can be performed by dividing by $3^{e_B}$ and obtaining the remainder. In some cases, a quotient is also obtained from the division operation that is used to perform modular reduction. Other types of modular reductions may be used. For example, one or more of the modular reductions to obtain block coefficients at 306 may be performed using a Montgomery reduction, a Barrett reduction, or another type of reduction.

In some implementations, integers can be converted between representations in different number systems to compute the block coefficients. For example, a quotient (e.g., $d_0$ or $d_1$ in the examples shown in FIGS. 4 and 5) from a first modular reduction can be converted from a first number system representation to a second number system representation (e.g., binary to ternary, or ternary to binary), so that a second modular reduction can be applied to the second number system representation of the quotient. For example, it may be faster to perform the second modular reduction on the second number system representation of the quotient.

In some implementations, at 306, one or more of the block coefficients is computed by performing a modular reduction in hardware (e.g., by parsing memory blocks or otherwise). For example, an integer can be reduced modulo $2^{e_A}$ by representing the integer in binary memory (e.g., the binary memory 110B shown in FIG. 1B), identifying a first block of the binary memory as a remainder and identifying a second block of the binary memory as a quotient. The quotient or remainder (or each) can then be identified as one of the block coefficients, in some instances. As an example, when the integer z is reduced modulo $2^{e_A}$ in FIG. 4, the integer z can be encoded in a binary memory; the block of binary memory containing the lowest-order bits can be identified as the remainder, and the block of binary memory containing the highest-order bits can be identified as the quotient; and the remainder can be identified as the block coefficient $c_0$. A similar technique can be used, for example, to compute the coefficients $c_2$ and $c_3$ in FIG. 4, and to compute the coefficient $c_1$ in FIG. 5.

As another example, an integer can be reduced modulo $3^{e_B}$ by representing the integer in ternary memory (e.g., the ternary memory 110A shown in FIG. 1B), identifying a first block of the ternary memory as a remainder and identifying a second block of the ternary memory as a quotient. The quotient or remainder (or each) can then be identified as one of the block coefficients, in some instances. As an example, when the integer z is reduced modulo $3^{e_B}$ in FIG. 5, the integer z can be encoded in a ternary memory; the block of ternary memory containing the lowest-order trits can be identified as the remainder, and the block of ternary memory containing the highest-order trits can be identified as the quotient; and the remainder can be identified as the block coefficient $c_0$. A similar technique can be used, for example, to compute the coefficients $c_2$ and $c_3$ in FIG. 5, and to compute the coefficient $c_1$ in FIG. 4.

At 308, a reduced representation of the integer is computed. In the example shown in FIG. 3, the reduced representation of the integer is computed based on the block coefficients obtained at 306, and the reduced representation is less than the prime modulus. In the example shown in FIG. 4, computing the reduced representation of the integer includes computing a sum $(c_0+c_2)+(c_1+c_3)2^{e_A}$. In the example shown in FIG. 5, computing the reduced representation of the integer includes computing a sum $(c_0+c_2)+(c_1+c_3)3^{e_B}$. Computing the reduced representation may include additional or different operations. For example, in some cases, a computed sum is greater than or equal to the prime modulus, and the prime modulus is subtracted from the sum to produce a representation of the integer that is less than the prime modulus. Thus, computing the reduced representation may include performing one or more operations (e.g., subtracting p or another appropriate value) in response to a determination that a sum is greater than the prime modulus. In some cases, the reduced representation of the integer is stored in a ternary memory. For example, when the first constant is $3^{e_A}$, the reduced representation can be stored in ternary memory to reduce the computation for a subsequent modular operation (e.g., modular multiplication).

FIG. 4 is a block diagram 400 showing block coefficients in an example modular reduction process. For instance, some or all of the example block coefficients shown in FIG. 4 may be computed in certain implementations of the modular reduction process 300 shown in FIG. 3. In the example shown in FIG. 4, an integer z is reduced by a prime of the form $p=1_A{}^{e_A}1_B{}^{e_B}f-1$, where $1_A=2$ and $1_B=3$ and $f=1$, such that $p=2^{e_A}3^{e_B}-1$.

In the example shown in FIG. 4, the integer z is initially a number satisfying $0 \leq z < p^2$. The integer z can also be represented in the form $$z = c_0 + c_1 2^{e_A} + c_2 2^{e_A} 3^{e_B} + c_3 2^{2e_A} 3^{e_B},$$

where $0 \leq c_0 < 2^{e_A}$, $0 \leq c_1 < 3^{e_B}$, $0 \leq c_2 < 2^{e_A}$, and $0 \leq c_3 < 3^{e_B}$. Since $2^{e_A} 3^{e_B} = 1$ in $F_p$, this equation reduces to:

$$z = c_0 + c_1 2^{e_A} + c_2 + c_3 2^{e_A}.$$

This gives a representation of z in $F_p$ which is between 0 and 2p. By subtracting p if necessary this produces a representative of z in $F_p$ which is between 0 and p. Example computations to obtain the block coefficients $c_0$, $c_1$, $c_2$, $c_3$ will now be described with reference to FIG. 4.

At 402, the integer z is represented as a number satisfying $0 \leq z < 2^{2e_A} 3^{2e_B}$. The integer z is then divided or otherwise reduced by $2^{e_A}$ to compute the block coefficients $c_0$ and $d_0$. At 404, the integer z is represented as $$z = c_0 + d_0 2^{e_A},$$

where $0 \leq c_0 < 2^{e_A}$ and $0 \leq d_0 < 2^{e_A} 3^{2e_B}$. In some cases, the block coefficients $c_0$ and $d_0$ are, respectively, a remainder and a quotient obtained by reducing the integer z modulo the constant $2^{e_A}$. In some cases, the coefficients $c_0$ and $d_0$ may be obtained quickly, for example, by parsing a representation of the integer z in a binary memory. If the integer z is represented in binary, then $c_0$ is the smallest (lowest order) $e_A$ bits in the binary representation, whereas $d_0$ is the remaining (higher order) bits. More precisely, if the binary representation of z is a bit string $b_k \ldots b_0$, where $z = b_k 2^k + \ldots + b_0$, then $c_0$ is represented in binary as the bit string $b_{e_A-1} \ldots b_0$ and $d_0$ is represented in binary as the bit string $b_k \ldots b_{e_A}$.

As shown in FIG. 4, the integer coefficient $d_0$ is then divided or otherwise reduced by $3^{e_B}$ to compute the block coefficients $c_1$ and $d_1$. At 406, the integer coefficient $d_0$ is represented as $$d_0 = c_1 + d_1 3^{e_B},$$

where $0 \leq c_1 < 3^{e_B}$ and $0 \leq d_1 < 2^{e_A} 3^{e_B}$. In some cases, the block coefficients $c_1$ and $d_1$ are, respectively, a remainder and a quotient obtained by reducing the integer $d_0$ modulo the constant $3^{e_B}$. In some cases, the block coefficients $c_1$ and $d_1$ can be computed faster by representing the integer coefficient $d_0$ in a ternary (base-3) number system before dividing by $3^{e_B}$. For example, the coefficients $c_1$ and $d_1$ may be obtained quickly by parsing a representation of the integer $d_0$ in a ternary memory. If the integer $d_0$ is represented in ternary, then $c_1$ is the smallest (lowest order) $e_B$ trits in the ternary representation, whereas $d_1$ is the remaining (higher order) trits. In some cases, software algorithms may be used to convert integers between binary and ternary representations. Additional speed may be obtained, in some instances, by converting the integer coefficient $d_0$ from a binary representation to a ternary representation in hardware.

As shown in FIG. 4, the integer coefficient $d_1$ is then divided or otherwise reduced by $2^{e_A}$ to compute the block coefficients $c_2$ and $c_3$. At 408, the integer coefficient $d_1$ is represented as $$d_1 = c_2 + c_3 2^{e_A},$$

where $0 \leq c_2 < 2^{e_A}$ and $0 \leq c_3 < 3^{e_B}$. In some cases, the block coefficients $c_2$ and $c_3$ are, respectively, a remainder and a quotient obtained by reducing the integer $d_1$ modulo the constant $2^{e_A}$. In some cases, the coefficients $c_2$ and $c_3$ may be obtained quickly, for example, by parsing a representation of the integer $d_1$ in a binary memory as described above. If the integer $d_1$ is represented in binary, then $c_2$ is the smallest (lowest order) $e_A$ bits in the binary representation, whereas $c_3$ is the remaining (higher order) bits.

As shown at 408 in FIG. 4, the integer z can now be represented $$z = c_0 + c_1 2^{e_A} + c_2 2^{e_A} 3^{e_B} + c_3 2^{2e_A} 3^{e_B}.$$

As shown at 410 in FIG. 4, because $2^{e_A} 3^{e_B} = 1$ in $F_p$, the representation from 408 can be reduced to $$z = (c_0 + c_2) + (c_1 + c_3) 2^{e_A}.$$

Adding $e_0 = c_0 + c_2$ and $e_1 = c_1 + c_3$, the integer z can now be represented using two block coefficients $$z = e_0 + e_1 2^{e_A},$$

where $0 \leq c_2 < 2 \cdot 2^{e_A}$ and $0 \leq c_3 < 2 \cdot 3^{e_B}$. Therefore, the block form expression $z = e_0 + e_1 2^{e_A}$ is a representation of z in $F_p$ that is between 0 and 2p. By subtracting p, if necessary, a representative of z in $F_p$ that is between 0 and p is obtained.

The example shown in FIG. 4 reduces the problem of the modular reduction of z modulo p to reducing smaller blocks modulo $1_A^{e_A}$ and $1_B^{e_B}$. Each of the smaller block reductions, modulo $1_A^{e_A}$ or $1_B^{e_B}$, can be performed by representing the number to be reduced in base $1_A$ or $1_B$, respectively. More generally, given a number x, it may be easier to find integers q and r such that $x = q l^e + r$ if the number x is written in base l. For this reason, depending on various factors at the time of implementation, certain operations may be executed faster by converting the relevant blocks to base $1_A$ or $1_B$ to calculate modulo $1_A^{e_A}$ and modulo $1_B^{e_B}$, respectively. Other techniques could be used to calculate the modular reductions of the blocks modulo $1_A^{e_A}$ and $1_B^{e_B}$, such as Barrett reduction and Montgomery reduction, in some cases.

The example shown in FIG. 4 considers the parameter values $1_A = 2$ and $1_B = 3$ (such that $p = 2^{e_A} 3^{e_B} f - 1$), which may find application in some supersingular isogeny-based cryptosystems and potentially other contexts. However, the techniques shown in FIG. 4 can be applied to other values of $1_A$ and $1_B$, as well as other forms of the prime p. For example, given a prime of the form $p = 1_A^{e_A} 1_B^{e_B} f \pm d$, for any primes $1_A$ and $1_B$ where d and f are small numbers, an integer z can be expressed in terms of one prime $1_A$ or $1_B$. For instance, the integer z can be expressed $$z = c_0 + c_1 1_A^{e_A} + c_2 1_A^{e_A} 1_B^{e_B} f + c_3 1_A^{2e_A} 1_B^{e_B} f.$$

Then the reduce representation can be computed as $z = c_0 \mp dc_2 + (c_1 \mp dc_3) 1_A^{e_A}$.

FIG. 5 is a block diagram 500 showing block coefficients in an example modular reduction process. For instance, some or all of the example block coefficients shown in FIG. 5 may be computed in certain implementations of the modular reduction process 300 shown in FIG. 3. In the example shown in FIG. 5, an integer z is reduced by a prime of the form $p = 1_A^{e_A} 1_B^{e_B} f - 1$, where $1_A = 2$ and $1_B = 3$ and $f = 1$, such that $p = 2^{e_A} 3^{e_B} - 1$.

In the example shown in FIG. 5, the integer z is initially a number satisfying $0 \leq z < p^2$. The integer z can also be represented in the form $$z = c_0 + c_1 3^{e_B} + c_2 2^{e_A} 3^{e_B} + c_3 2^{e_A} 3^{2e_B},$$

where $0 \leq c_0 < 3^{e_B}$, $0 \leq c_1 < 2^{e_A}$, $0 \leq c_2 < 3^{e_B}$, and $0 \leq c_3 < 2^{e_A}$. Since $2^{e_A} 3^{e_B} = 1$ in $F_p$, this equation reduces to:

$$z = c_0 + c_1 3^{e_B} + c_2 + c_3 3^{e_B}.$$

This gives a representation of z in $F_p$ which is between 0 and 2p. By subtracting p if necessary this produces a representative of z in $F_p$ which is between 0 and p. To obtain the block coefficients $c_0$, $c_1$, $c_2$, $c_3$, computations analogous to those shown in FIG. 4 may be used.

For example, the integer z can be initially represented as a number satisfying $0 \leq z < 2^{2e_A} 3^{2e_B}$. The integer z can then be divided or otherwise reduced by $3^{e_B}$ to compute the block coefficients $c_0$ and $d_0$, such that the integer z can be represented as $$z = c_0 + d_0 3^{e_B},$$

where $0 \leq c_0 < 3^{e_B}$ and $0 \leq d_0 < 2^{e_A} 3^{e_B}$. In some cases, the block coefficients $c_0$ and $d_0$ are, respectively, a remainder and a quotient obtained by reducing the integer z modulo the constant $3^{e_B}$. In some cases, the coefficients $c_0$ and $d_0$ may be obtained quickly, for example, by parsing a representation of the integer z in a ternary memory. The integer coefficient $d_0$ may then be divided or otherwise reduced by $2^{e_A}$ to compute block coefficients $c_1$ and $d_1$, such that the integer coefficient $d_0$ can be represented as $$d_0 = c_1 + d_1 2^{e_A},$$

where $0 \leq c_1 < 2^{e_A}$ and $0 \leq d_1 < 2^{e_A} 3^{e_B}$. In some cases, the block coefficients $c_1$ and $d_1$ are, respectively, a remainder and a quotient obtained by reducing the integer $d_0$ modulo the constant $2^{e_A}$. In some cases, the block coefficients $c_1$ and $d_1$ can be computed faster by representing the integer coefficient $d_0$ in a binary number system before dividing by $2^{e_A}$. The integer coefficient $d_1$ can then be divided or otherwise reduced by $3^{e_B}$ to compute the block coefficients $c_2$ and $c_3$, such that the integer coefficient $d_1$ can be represented as $$d_1 = c_2 + c_3 3^{e_B},$$

where $0 \leq c_2 < 3^{e_B}$ and $0 \leq c_3 < 2^{e_A}$. In some cases, the block coefficients $c_2$ and $c_3$ are, respectively, a remainder and a quotient obtained by reducing the integer $d_1$ modulo the constant $3^{e_B}$. In some cases, the coefficients $c_2$ and $c_3$ may be obtained quickly, for example, by parsing a representation of the integer $d_1$ in a ternary memory.

As shown at 502 in FIG. 5, the integer z can now be represented as $$z = c_0 + c_1 3^{e_B} + c_2 2^{e_A} 3^{e_B} + c_3 2^{e_A} 3^{2e_B}.$$

As shown at 504 in FIG. 5, because $2^{e_A} 3^{e_B} = 1$ in $F_p$, the representation from 502 can be reduced to $$z = (c_0 + c_2) + (c_1 + c_3) 3^{e_B}.$$

Adding $e_0 = c_0 + c_2$ and $e_1 = c_1 + c_3$, the integer z can now be represented using two block coefficients $$z = e_0 + e_1 3^{e_B},$$

where $0 \leq c_2 < 2 \cdot 3^{e_B}$ and $0 \leq c_3 < 2 \cdot 2^{e_A}$. Therefore, the block form expression $z = e_0 + e_1 3^{e_B}$ is a representation of z in $F_P$ that is between 0 and 2p. By subtracting p, if necessary, a representative of z in $F_P$ that is between 0 and p is obtained.

Figure 6:
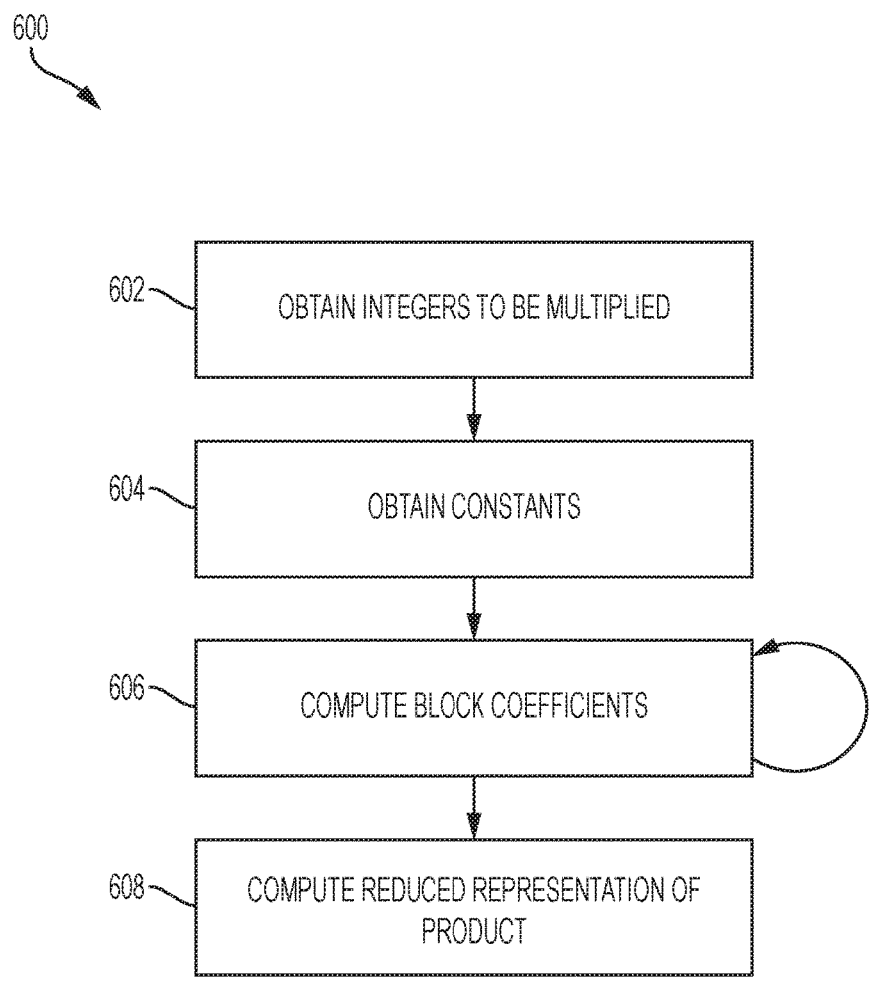
FIG. 6 is a flow diagram showing an example technique for modular multiplication.

FIG. 6 is a block diagram showing an example process 600 for modular multiplication. The example process 600 can be performed, for example, by a computer system that includes a memory and a processor. For instance, operations in the process 600 may be performed by either of the nodes 102, 104 in the example communication system 100 shown in FIG. 1 or in another type of system. In some cases, the example process 600 can be performed or utilized as part of a cryptography protocol (e.g., by an entity performing a key agreement protocol) or in another type of process defined by a cryptosystem.

In some examples, the process 600 is executed in the context of a supersingular isogeny-based cryptography protocol. For example, the process 600 may be used to perform modular multiplication in a supersingular isogeny-based key agreement protocol (e.g., SIDH or another isogeny-based key agreement protocol), a supersingular isogeny-based key encapsulation mechanism (KEM) protocol, a supersingular isogeny-based encryption protocol, a supersingular isogeny-based decryption protocol, a supersingular isogeny-based signature protocol, a supersingular isogeny-based verification protocol, or another type of supersingular isogeny-based protocol.

The example process 600 may include additional or different operations, and the operations may be performed in the order shown or in another order. In some cases, one or more of the operations shown in FIG. 6 are implemented as processes that include multiple operations, sub-processes for other types of routines. In some cases, operations can be combined, performed in another order, performed in parallel, iterated or otherwise repeated or performed in another manner.

At 602, integers to be multiplied are obtained. For example, the integers may be computed by a processor, received from memory or another source, or the integers may be obtained in another manner. In the example shown in FIG. 6, the integers are obtained during the execution of a cryptography protocol (e.g., as the output of addition, subtraction or another operation), and are identified to be multiplied modulo a prime modulus defined by the cryptosystem. For example, the prime modulus can represent a prime characteristic of a finite field defined by the supersingular isogeny-based cryptosystem.

At 604, constants are obtained. For example, the constants may be computed by a processor, received from memory or another source, or the constants may be obtained in another manner. In the example shown in FIG. 6, the prime modulus is defined by the cryptosystem in terms of a set of constants, and the set of constants includes a first constant and a second constant, and possibly other constants. For example, the prime modulus may have the form $p=f(l_1^{e_1}, \ldots, l_k^{e_k})$ or $p=l_1^{e_1} \cdot \ldots \cdot l_k^{e_k} f \pm d$, where each $l_i$ represents a distinct prime for $1 \leq i \leq k$, each $e_i$ represents a respective integer value for $1 \leq i \leq k$, the set of constants is the set $\{l_i^{e_i}\}$ for $1 \leq i \leq k$, the first constant is $l_1^{e_1}$, and the second constant is $l_2^{e_2}$. As another example, the prime modulus can have the form $p=ab \pm d$, where the first constant is a, the second constant is b, the first constant a and the second constant b are relatively prime, and d represents an integer value. In the example shown in FIGS. 7A-7C, the prime modulus has the form $p=2^{e_A} 3^{e_B} f \pm d$.

The constants obtained at 604 are integer values, which are used at 606 to compute block coefficients. In the example shown in FIGS. 7A-7C, the constants $2^{e_A}$ and $3^{e_B}$ are used to compute block coefficients. In some cases, the constants obtained at 604 include some or all of the constants that are used to define the prime modulus. For example, the set of constants $\{l_i^{e_i}\}$ or $\{a, b\}$ may be obtained.

At 606, block coefficients are computed. In some cases, the block coefficients are computed using the techniques shown in FIGS. 7A-7C, or the block coefficients may be computed in another manner.

Computing the block coefficients may include performing one or more reductions modulo each of the constants obtained at 604. For example, when the prime modulus has the form $p=f(l_1^{e_1}, \ldots, l_k^{e_k})$ or $p=l_1^{e_1} \cdot \ldots \cdot l_k^{e_k} f \pm d$, computing the block coefficients may include performing at least one reduction modulo each value of $l_i^{e_i}$ (for $1 < i \leq k$). In the examples shown in FIGS. 7A-7C (where k=2), at least one reduction is performed modulo $2^{e_A}$ and at least one reduction is performed modulo $3^{e_B}$.

Figure 7B:
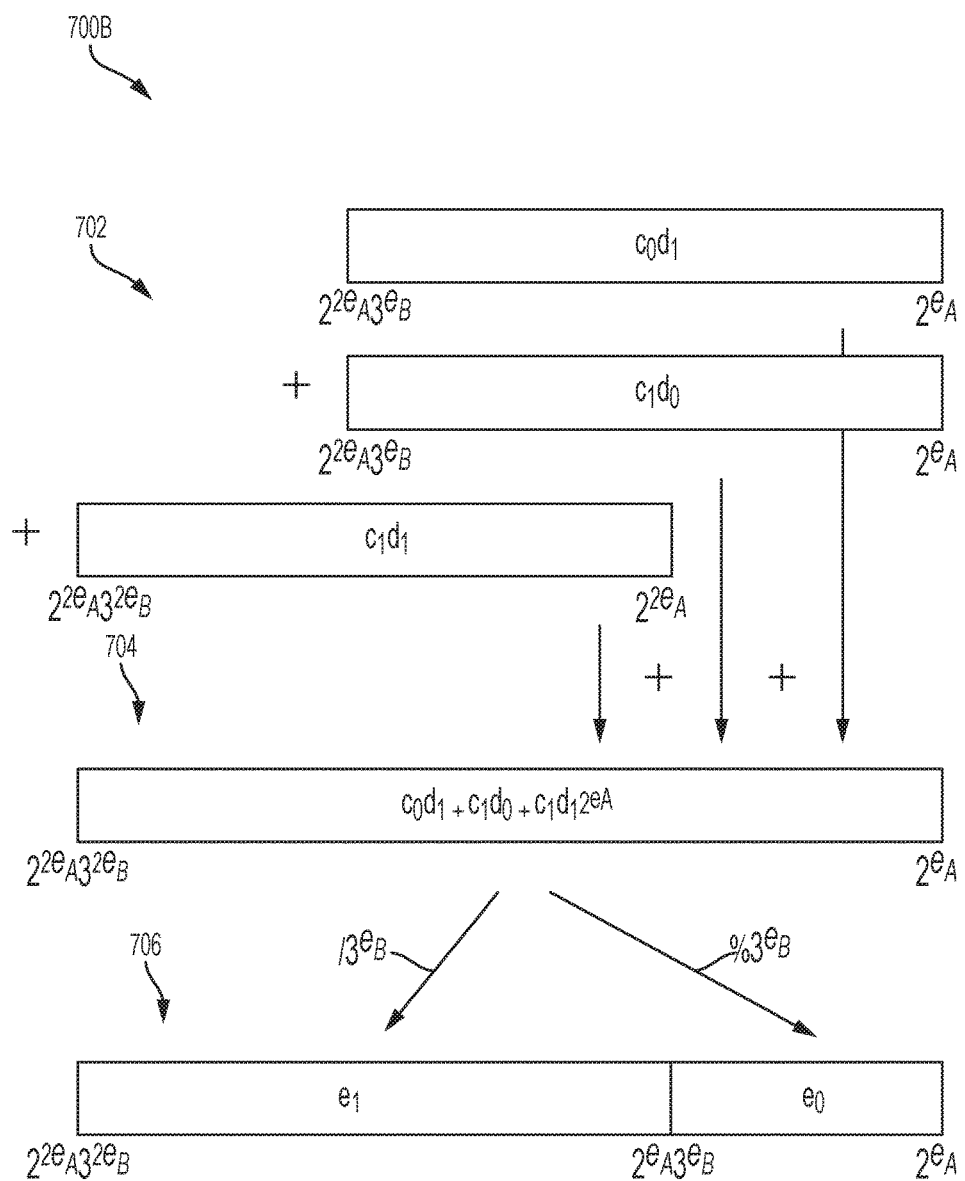
Figure 7C:
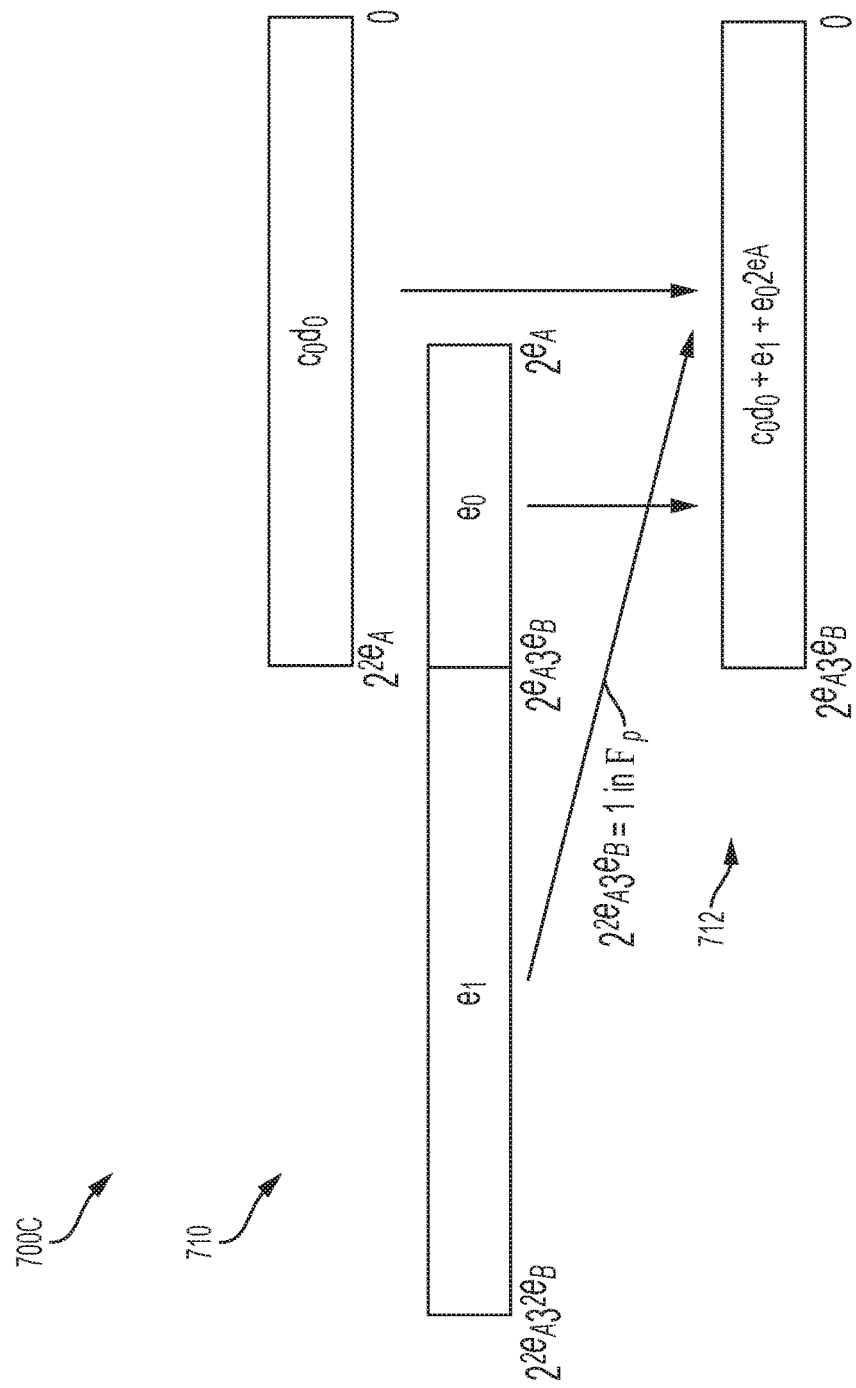

In the example shown in FIG. 6, the block coefficients are computed at 606 to represent the product of the integers (obtained at 602) in block form. For instance, the set of block coefficients $c_0$, $d_0$, $c_1$, $d_1$, $e_0$, $e_1$ and other block coefficients shown in FIGS. 7A-7C are computed to represent the product xy in block form. In that example, the block coefficients $c_0$, $c_1$, $d_0$, $d_1$ are each obtained by modular reductions modulo a first constant ($2^{e_A}$ in FIGS. 7A-7C), while the block coefficients $e_0$ and $e_1$ are each obtained by modular reduction modulo a second constant ($3^{e_B}$ in FIGS. 7A-7C). As shown in FIG. 7C, a first block coefficient $c_0 d_0$ is the product of remainders obtained by first modular reductions (applied to each of the integers x and y) modulo the first constant $2^{e_A}$; and second and third block coefficients $e_0$, $e_1$ are the remainder and the quotient obtained by a second modular reduction (applied to another integer $c_0 d_1 + c_1 d_0 + c_1 d_1 2^{e_A}$) modulo the second constant $3^{e_B}$.

In some implementations, one or more of the modular reductions to obtain block coefficients at 606 is performed by division. For example, reduction modulo $2^{e_A}$ can be performed by dividing by $2^{e_A}$ and obtaining the remainder, and reduction modulo $3^{e_B}$ can be performed by dividing by $3^{e_B}$ and obtaining the remainder. In some cases, a quotient is also obtained from the division operation that is used to perform modular reduction. Other types of modular reductions may be used. For example, one or more of the modular reductions to obtain block coefficients at 606 may be performed using a Montgomery reduction, a Barrett reduction, or another type of reduction.

In some implementations, integers can be converted between representations in different number systems to compute the block coefficients. For example, an integer (e.g., $c_0 d_1 + c_1 d_0 + c_1 d_1 2^{e_A}$ in the example shown in FIG. 7B) based on values produced by first modular reductions can be converted from a first number system representation to a second number system representation (e.g., binary to ternary, or ternary to binary), so that a second modular reduction can be applied to the second number system representation of the integer. For example, it may be faster to perform the second modular reduction on the second number system representation of the integer.

In some implementations, at 606, one or more of the block coefficients is computed by performing a modular reduction in hardware. As an example, when the integer x is reduced modulo $2^{e_A}$ in the example shown in FIGS. 7A-7C, the integer x can be encoded in a binary memory; the block of binary memory containing the lowest-order bits can be identified as the remainder, and the block of binary memory containing the highest-order bits can be identified as the quotient; and the remainder and quotient can then be used to compute block coefficients. As another example, when the integer $c_0 d_1 + c_1 d_0 + c_1 d_1 2^{e_A}$ is reduced modulo $3^{e_B}$ in FIG. 7B, the integer $c_0 d_1 + c_1 d_0 + c_1 d_1 2^{e_A}$ can be encoded in a ternary memory; the block of ternary memory containing the lowest-order trits can be identified as the remainder, and the block of ternary memory containing the highest-order trits can be identified as the quotient; and the quotient and remainder can be identified as the block coefficients $e_1$, $e_0$.

At 608, a reduced representation of the product is computed. In the example shown in FIG. 6, the reduced representation of the product is computed based on the block coefficients obtained at 606, and the reduced representation is less than the prime modulus. In the example shown in FIG. 7A-7C, computing the reduced representation of the product includes computing a sum $c_0 d_0 + e_0 + e_1 2^{e_A}$. In other examples, computing the reduced representation of the product includes computing a sum $c_0 d_0 + e_0 + e_1 3^{e_B}$. Computing the reduced representation may include additional or different operations. For example, in some cases, a computed sum is greater than or equal to the prime modulus, and the prime modulus is subtracted from the sum to produce a representation of the product that is less than the prime modulus. Thus, computing the reduced representation may include performing one or more operations (e.g., subtracting p or another appropriate value) in response to a determination that a sum is greater than the prime modulus.

FIGS. 7A-7C are block diagrams 700A, 700B, 700C showing block coefficients in an example modular multiplication process. For instance, some or all of the example block coefficients shown in FIGS. 7A-7C may be computed in certain implementations of the modular multiplication process 600 shown in FIG. 6. In the example shown in FIGS. 7A-7C, a product xy of two integers (x and y) is computed modulo a prime of the form $p = 1_A^{e_A} 1_B^{e_B} f - 1$, where $1_A = 2$ and $1_B = 3$ and $f = 1$, such that $p = 2^{e_A} 3^{e_B} - 1$.

In the example shown in FIGS. 7A-7C, it is assumed that the two constants $2^{e_A}$ and $3^{e_B}$ have approximately the same number of bits, and $2^{e_A} < 3^{e_B}$. These conditions find application in certain supersingular isogeny-based cryptography protocols (e.g., SIDH, and potentially others) where $p = 2^{372} 3^{239} - 1$. To derive the representation shown in FIG. 7A, the first integer x can be represented in the block form $$x = c_0 + c_1 2^{e_A},$$

where $0 \leq c_0 < 2^{e_A}$ and $0 \leq c_1 < 3^{e_B}$. Similarly, the second integer y can be represented in the block form $$y = d_0 + d_1 2^{e_A},$$

where $0 \leq d_0 < 2^{e_A}$ and $0 \leq d_1 < 3^{e_B}$. In some cases, the block coefficients $c_0$ and $c_1$ are, respectively, a remainder and a quotient obtained by reducing the integer x modulo the constant $2^{e_A}$; and the block coefficients $d_0$ and $d_1$ are, respectively, a remainder and a quotient obtained by reducing the integer y modulo the constant $2^{e_A}$. In some cases, the block coefficients $c_0$, $c_1$, $d_0$ and $d_1$ can be computed faster by representing the integers x and y in a binary number system before dividing by $2^{e_A}$.

In the example shown in FIGS. 7A-7C, the block form of the respective integers x and y are multiplied together $$xy = (c_0 + c_1 2^{e_A})(d_0 + d_1 2^{e_A})$$

to obtain the representation shown in FIG. 7A $$xy = c_0 d_0 + c_0 d_1 2^{e_A} + c_1 d_0 2^{e_A} + c_1 d_1 2^{2e_A}.$$

As shown at 702 and 704 in FIG. 7B, the last three terms of the sum can be combined to compute an integer $c_0 d_1 + c_1 d_0 + c_1 d_1 2^{e_A}$ for the block form expression $$xy = c_0 d_0 + (c_0 d_1 + c_1 d_0 + c_1 d_1 2^{e_A}) 2^{e_A}.$$

As shown at 706 in FIG. 7B, the integer $c_0 d_1 + c_1 d_0 + c_1 d_1 2^{e_A}$ can then be represented in block form as:

$$c_0 d_1 + c_1 d_0 + c_1 d_1 2^{e_A} = e_0 + e_1 3^{e_B},$$

where $0 \leq e_0 < 3^{e_B}$ and $0 \leq e_1 < 2^{2e_A}$. In some cases, the block coefficients $e_0$ and $e_1$ are, respectively, a remainder and a quotient obtained by reducing the integer $c_0 d_1 + c_1 d_0 + c_1 d_1 2^{e_A}$ modulo the constant $3^{e_B}$. In some cases, the block coefficients $e_0$ and $e_1$ can be computed faster by representing the term $c_0 d_1 + c_1 d_0 + c_1 d_1 2^{e_A}$ in a ternary number system before dividing by $3^{e_B}$. As shown in FIG. 7C, substituting this back into the equation for the product xy gives the expression $$xy = c_0 d_0 + (e_0 + e_1 3^{e_A}) 2^{e_A}.$$

Because $2^{e_A} 3^{e_B} = 1$ in $F_p$, this implies $$xy = c_0 d_0 + e_1 + e_0 2^{e_A}.$$

Here, the assumption that $2^{e_A} < 3^{e_B}$ leads to $0 \leq c_0 d_0 < 2^{2e_A} < p$ and $0 \leq e_1 < 2^{2e_A} < p$. This means that $0 \leq c_0 d_0 + e_1 + e_0 2^{e_A} < 2p$. Therefore, the block form expression $xy = c_0 d_0 + e_1 + e_0 2^{e_A}$ is a representation of xy in $F_p$ that is between 0 and 2p. By subtracting p if necessary, a representation of xy that is between 0 and p is obtained.

The example shown in FIGS. 7A-7C reduces the problem of the modular reduction of xy modulo p to reducing smaller blocks modulo $1_A^{e_A}$ and $1_B^{e_B}$. The problem of calculating xy modulo p is effectively changed to calculating a smaller integer $c_0 d_1 + c_1 d_0 + c_1 d_1 2^{e_A}$ modulo $1_B^{e_B}$, where $1_B^{e_B}$ is a number having about half as many bits as p in some cases. Each of the smaller block reductions, modulo $1_A^{e_A}$ or $1_B^{e_B}$, can be performed by representing the number to be reduced in base $1_A$ or $1_B$, respectively. Other techniques could be used to calculate the modular reductions of the integers modulo $1_A^{e_A}$ and $1_B^{e_B}$, such as Barrett reduction and Montgomery reduction, in some cases.

In some implementations, block coefficients are computed in another manner to find the product xy of the two integers (x and y) modulo $p = 1_A^{e_A} 1_B^{e_B} f - 1$. For example, instead of initially reducing each of the integers by $2^{e_A}$, they could initially be reduced by $3^{e_B}$. For instance, the following computations can be used as an alternative to the computations shown in FIGS. 7A-7C. Again it is assumed that the two constants $2^{e_A}$ and $3^{e_B}$ have approximately the same number of bits, and $2^{e_A} < 3^{e_B}$.

The first integer x can be represented in the block form $$x = c_0 + c_1 3^{e_B}$$

where $0 \leq c_0 < 3^{e_B}$ and $0 \leq c_1 < 2^{e_A}$. Similarly, the second integer y can be represented in the block form $$y = d_0 + d_1 3^{e_B},$$

where $0 < d_0 < 3^{e_B}$ and $0 < d_1 < 2^{e_A}$. In some cases, the block coefficients $c_0$ and $c_1$ are, respectively, a remainder and a quotient obtained by reducing the integer x modulo the constant $3^{e_B}$; and the block coefficients $d_0$ and $d_1$ are, respectively, a remainder and a quotient obtained by reducing the integer y modulo the constant $3^{e_B}$. In some cases, the block coefficients $c_0$, $c_1$, $d_0$ and $d_1$ can be computed faster by representing the integers x and y in a ternary number system before dividing by $3^{e_B}$.

The block form of the integers x and y can then be multiplied together $$xy = (c_0 + c_1 3^{e_B})(d_0 + d_1 3^{e_B}),$$

and expand the expression on the right-hand side to get, to obtain the sum $$xy = c_0 d_0 + c_0 d_1 3^{e_B} + c_1 d_0 3^{e_B} + c_1 d_1 3^{2e_B}.$$

The last three terms of the sum can be combined to compute an integer $c_0 d_1 + c_1 d_0 + c_1 d_1 3^{e_B}$ for the block form expression $$xy = c_0 d_0 + (c_0 d_1 + c_1 d_0 + c_1 d_1 3^{e_B}) 3^{e_B}.$$

The integer $c_0 d_1 + c_1 d_0 + c_1 d_1 3^{e_B}$ can then be represented in block form as:

$$c_0 d_1 + c_1 d_0 + c_1 d_1 3^{e_B} = e_0 + e_1 2^{e_A},$$

where $0 \leq e_0 < 2^{e_A}$ and $0 \leq e_1 <_3 2^{e_B}$. In some cases, the block coefficients $e_0$ and $e_1$ are, respectively, a remainder and a quotient obtained by reducing the integer $c_0 d_1 + c_1 d_0 + c_1 d_1 3^{e_B}$ modulo the constant $2^{e_A}$. In some cases, the block coefficients $e_0$ and $e_1$ can be computed faster by representing the term $c_0 d_1 + c_1 d_0 + c_1 d_1 3^{e_B}$ in a binary number system before dividing by $2^{e_A}$. Substituting this back into the equation for the product xy gives the expression $$xy = c_0 d_0 + (e_0 + e_1 2^{e_A}) 3^{e_B}.$$

Because $2^{e_A} 3^{e_B} = 1$ in $F_p$, this implies $$xy = c_0 d_0 + e_1 + e_0 3^{e_B}.$$

Here, the assumption that $2^{e_A} > 3^{e_B}$ leads to $0 \leq c_0 d_0 < 3^{2 e_B} < p$ and $0 \leq e_1 < 3^{2 e_B} < p$. This means that $0 < c_0 d_0 + e_1 + e_0 3^{e_B} < 2p$. 6. Therefore, the block form expression $xy = c_0 d_0 + e_1 + e_0 3^{e_B}$ is a representation of xy in $F_p$ that is between 0 and 2p. By subtracting p if necessary, a representation of xy that is between 0 and p is obtained.

In some cases, the expression $xy = c_0 d_0 + (e_0 + e_1 2^{e_A}) 3^{e_B}$ can be reduced modulo $3^{e_B}$, and this representation can be used for future multiplications. (For example, in a later-executed modular multiplication x'y', the value x' mod $3^{e_B}$ or y' mod $3^{e_B}$ could be retrieved from memory if y'=xy or x'=xy from an earlier modular multiplication. To reduce the expression $c_0 d_0 + (e_0 + e_1 2^{e_A}) 3^{e_B}$ modulo $3^{e_B}$, represent $c_0 d_0$ as $f_0 + f_1 3^{e_B}$, where $0 \leq f_0 < 3^{e_B}$ and $0 \leq f_1 < 2^{e_A}$, so that $xy = (e_1 + f_0) + (e_0 + f_1) 3^{e_B}$. This representation of xy can then be stored for future use.

Accordingly, in the example shown in FIGS. 7A-7C, the number $c_0 d_1 + c_1 d_0 + c_1 d_1 2^{e_A}$ is reduced modulo $3^{e_B}$ (where $0 \leq c_0 d_1 + c_1 d_0 + c_1 d_1 2^{e_A} < 2^{e_A} 3^{2 e_B}$), whereas in the example alternative outlined above, two integers x and y (between 0 and p) are reduced modulo $3^{e_B}$. In some cases, the modular reduction by $3^{e_B}$ in the example shown in FIGS. 7A-7C is faster than the alternative technique. For example, the example shown in FIGS. 7A-7C divides one number that is less than twice as big as p, whereas the alternative divides two numbers bounded by p. However, as noted above, the initial step of dividing two numbers by $3^{e_B}$ can be circumvented in some cases by storing this representation of $z = c_0 + c_1 3^{e_B}$ by $(c_0, c_1)$ for future use.

The example shown in FIGS. 7A-7C considers the parameter values $1_A = 2$ and $1_B = 3$ (such that $p = 2^{e_A} 3^{e_B} f - 1$), which may find application in some supersingular isogeny-based cryptosystems. However, the techniques shown in FIGS. 7A-7C can be applied to other values of $1_A$ and $1_B$, as well as other forms of the prime p. For example, given a prime of the form $p = 1_A^{e_A} 1_B^{e_B} f \pm d$, for any primes $1_A$ and $1_B$ where d and f are small numbers, the integers to be multiplied can be expressed $x = c_0 + c_1 1_A^{e_A}$ and $y = d_0 + d_1 1_A^{e_A}$. This allows the calculation of the product to be done in blocks. At this point, some of the blocks will need to be reduced modulo $1_B^{e_B}$. This may become easier if those blocks are represented base $1_B$. Moreover, a parameter regime where $1_A^{e_A} 1_B^{e_B} f = \mp d$ would allow for any easier representation of the product xy.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., non-magnetic drives (e.g., a solid-state drive), magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, an Internet-of-Things (IoT) device, a machine-to-machine (M2M) sensor or actuator, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

In a general aspect of what is described above, a modular reduction, modular multiplication, or possibly another type of modular operation, is performed in a cryptography protocol.

In a first example, an integer (e.g., z in the example shown in FIG. 4) is obtained during execution of a cryptography protocol defined by a cryptosystem. A prime modulus (e.g., p in the example shown in FIGS. 4 and 5) is obtained. The prime modulus is defined by the cryptosystem in terms of a set of constants (e.g., $\{l_1^{e_1}, \ldots, l_k^{e_k}\}$ or $\{a, b\}$). The set of constants includes at least a first constant and a second, distinct constant (e.g., $2^{e_A}$ and $3^{e_B}$ in the example shown in FIGS. 4 and 5). A set of block coefficients (e.g., $c_0$, $c_1$, $c_2$, $c_3$ in the example shown in FIGS. 4 and 5) is computed to represent the integer in a block form. The plurality of block coefficients includes a first block coefficient obtained by a first modular reduction modulo the first constant, and a second block coefficient obtained by a second modular reduction modulo the second constant. A reduced representation of the integer is computed based on the plurality of block coefficients, such that the reduced representation is less than the prime modulus.

In a second example, a computing system includes one or more processors and a computer-readable medium storing instructions that are operable when executed by the one or more processors to perform one or more operations of the first example.

In a third example, a computer-readable medium stores instructions that are operable when executed by a data processing apparatus to perform one or more operations of the first example.

Implementations of the first, second, or third example may include one or more of the following features. Computing the plurality of block coefficients can include obtaining a quotient (e.g., $d_0$ in the example shown in FIG. 4) from the first modular reduction; converting the quotient from a first number system representation (e.g., binary in the example shown in FIG. 4) to a second number system representation (e.g., ternary in the example shown in FIG. 4); and applying the second modular reduction to the second number system representation of the quotient. Each of the plurality of constants can have the form $l_i^{e_i}$, where each $l_i$ represents a distinct prime less than the prime modulus, and each $e_i$ represents a respective integer value.

Implementations of the first, second, or third example may include one or more of the following features. The prime modulus can have the form $p=f(l_1^{e_1}, \ldots, l_k^{e_k})$ where each $l_i$ represents a distinct prime for $1 \leq i \leq k$, each $e_i$ represents a respective integer value for $1 \leq i \leq k$, the plurality of constants is the set of $l_i^{e_i}$ for $1 \leq i \leq k$, the first constant is $l_1^{e_1}$, and the second constant is $l_2^{e_2}$; and computing the plurality of block coefficients can include performing at least one reduction modulo $l_i^{e_i}$ for $1 \leq i \leq k$. The prime modulus can have the form $p=l_1^{e_1} \cdot \ldots \cdot l_k^{e_k} f \pm d$, where each $l_i$ represents a distinct prime for $1 \leq i \leq k$, each $e_i$ represents a respective integer value for $1 \leq i \leq k$, the plurality of constants is the set of $l_i^{e_i}$ for $1 \leq i \leq k$, the first constant is $l_1^{e_1}$, the second constant is $l_2^{e_2}$, and f and d represent integer values; and computing the plurality of block coefficients can include performing at least one reduction modulo $l_i^{e_i}$ for $1 \leq i \leq k$. The prime modulus can have the form $p=ab \pm d$, where the first constant is a, the second constant is b, the first constant a and the second constant b are relatively prime, and d represents an integer value.

Implementations of the first, second, or third example may include one or more of the following features. The prime modulus can have the form $p=2^{e_A} 3^{e_B} f \pm d$, where the first constant is $2^{e_A}$, the second constant is $3^{e_B}$, and f and d represent integer values. The first modular reduction can be performed in hardware by representing a first value (e.g., z or $d_1$ in the example shown in FIG. 4) in binary memory; identifying a first block of the binary memory as a first remainder (e.g., $c_0$ or $c_2$ in the example shown in FIG. 4); and identifying a second block of the binary memory as a first quotient (e.g., $d_0$ or $c_3$ in the example shown in FIG. 4). The first remainder can be identified as the first block coefficient. The first quotient can be converted from a binary representation to a ternary representation, wherein the second modular reduction comprises reducing the ternary representation of the first quotient modulo the second constant $3^{e_B}$. The second modular reduction can be performed in hardware by representing the first quotient in a ternary memory; identifying a first block of the ternary memory as a second remainder (e.g., $c_1$ in the example shown in FIG. 4); and identifying a second block of the ternary memory as a second quotient (e.g., $d_1$ in the example shown in FIG. 4). The second remainder can be identified as the second block coefficient.

Implementations of the first, second, or third example may include one or more of the following features. The prime modulus can have the form $p=2^{e_A}3^{e_B}f\pm d$, where the first constant is $2^{e_A}$, the second constant is $3^{e_B}$, and f and d represent integer values. Computing the plurality of block coefficients can include computing the first block coefficient $c_0$, the second block coefficient $c_1$, a third block coefficient $c_2$, and a fourth block coefficient $c_3$. The first block coefficient $c_0$ can be a first remainder obtained by performing the first modular reduction modulo the first constant $2^{e_A}$. The second block coefficient $c_1$ can be a second remainder obtained by performing the second modular reduction modulo the second constant $3^{e_A}$.

Implementations of the first, second, or third example may include one or more of the following features. The prime modulus can have the form $p=2^{e_A}3^{e_B}f\pm d$, where the first constant is $2^{e_A}$, the second constant is $3^{e_B}$, and f and d represent integer values. Computing the plurality of block coefficients can include computing a first remainder $c_0$ and a first quotient $d_0$ by reducing the integer modulo the first constant $2^{e_A}$; computing a second remainder $c_1$ and a second quotient $d_1$ by reducing the first quotient $d_0$ modulo the second constant $3^{e_B}$; and computing a third remainder $c_2$ and a third quotient $c_3$ by reducing the second quotient $d_1$ modulo the first constant $2^{e_A}$; and computing the reduced representation of the integer based on the plurality of block coefficients comprises computing a sum $(c_0+c_2)+(c_1+c_3)2^{e_A}$. Computing the reduced representation of the integer based on the plurality of block coefficients can include, in response to a determination that the sum is greater than or equal to the prime modulus (p), subtracting the prime modulus (p) from the sum.

Implementations of the first, second, or third example may include one or more of the following features. The prime modulus can have the form $p=2^{e_A}3^{e_B}f\pm d$, where the first constant is $3^{e_B}$, the second constant is $2^{e_A}$, and f and d represent integer values. The first modular reduction can be performed in hardware by representing a first value in ternary memory; identifying a first block of the ternary memory as a first remainder; and identifying a second block of the ternary memory as a first quotient. The first remainder can be identified as the first block coefficient. The first quotient can be converted from a ternary representation to a binary representation, wherein the second modular reduction comprises reducing the binary representation of the first quotient modulo the second constant $2^{e_A}$. The second modular reduction in hardware by representing the first quotient in a binary memory; identifying a first block of the binary memory as a second remainder; and identifying a second block of the binary memory as a second quotient. The second remainder can be identified as the second block coefficient.

Implementations of the first, second, or third example may include one or more of the following features. The prime modulus can have the form $p=2^{e_A}3^{e_B}f\pm d$, where the first constant is $3^{e_B}$, the second constant is $2^{e_A}$, and f and d represent integer values. Computing a plurality of block coefficients can include computing the first block coefficient $c_0$, the second block coefficient $c_1$, a third block coefficient $c_2$, and a fourth block coefficient $c_3$. The first block coefficient $c_0$ can be a first remainder obtained by performing the first modular reduction modulo the first constant $3^{e_A}$. The second block coefficient $c_1$ can be a second remainder obtained by performing the second modular reduction modulo the second constant $2^{e_A}$ (e.g., in the example shown in FIG. 5).

Implementations of the first, second, or third example may include one or more of the following features. The prime modulus can have the form $p=2^{e_A}3^{e_B}f\pm d$, where the first constant is $3^{e_B}$, the second constant is $2^{e_A}$, and f and d represent integer values. Computing the plurality of block coefficients can include computing a first remainder $c_0$ and a first quotient $d_0$ by reducing the integer modulo the first constant $3^{e_B}$; computing a second remainder $c_1$ and a second quotient $d_1$ by reducing the first quotient $d_0$ modulo the second constant $2^{e_A}$; and computing a third remainder $c_2$ and a third quotient $c_3$ by reducing the second quotient $d_1$ modulo first constant $3^{e_B}$; and computing the reduced representation of the integer based on the plurality of block coefficients comprises computing a sum $(c_0+c_2)+(c_1+c_3)3^{e_B}$ (e.g., in the example shown in FIG. 5).

Implementations of the first, second, or third example may include one or more of the following features. The cryptosystem can be a supersingular isogeny-based cryptosystem, and the prime modulus can represent a prime characteristic of a finite field defined by the supersingular isogeny-based cryptosystem. The prime modulus can have the form $p=l_A^{e_A}l_B^{e_B}f\pm 1$, where $l_A$ and $l_B$ are distinct prime integers and f is another integer, where the first constant is $l_A^{e_A}$ and the second constant is $l_B^{e_B}$. The cryptography protocol can be a supersingular isogeny-based key agreement protocol (e.g., SIDH or another isogeny-based key agreement protocol).

In a fourth example, a pair of integers (e.g., x, y in the example shown in FIGS. 7A-7C) is obtained during execution of a cryptography protocol defined by a cryptosystem. A prime modulus (e.g., p in the example shown in FIGS. 7A-7C) is obtained. The prime modulus is defined by the cryptosystem in terms of a set of constants (e.g., $\{(l_1^{e_1}, \ldots, l_k^{e_k}\}$ or $\{a, b\}$). The set of constants includes at least a first constant and a second, distinct constant (e.g., $2^{e_A}$ and $3^{e_B}$ in the example shown in FIGS. 7A-7C). A set of block coefficients (e.g., $c_0d_0$, $e_0$, $e_1$ in the example shown in FIGS. 7A-7C) is computed to represent the product (e.g., xy in the example shown in FIGS. 7A-7C) of the pair of integers in a block form. The set of block coefficients includes a first block coefficient (e.g., $c_0d_0$ in the example shown in FIGS. 7A-7C) based on reducing each of the integers modulo the first constant; and a second block coefficient (e.g., $e_0$ in the example shown in FIGS. 7A-7C) based on reducing another integer (e.g., $(c_0d_1+c_1d_0+c_1d_1 2^{e_A})$ in the example shown in FIGS. 7A-7C) modulo the second constant. A reduced representation of the product of the pair of integers is computed based on the plurality of block coefficients, such that the reduced representation is less than the prime modulus (p).

In a fifth example, a computing system includes one or more processors and a computer-readable medium storing instructions that are operable when executed by the one or more processors to perform one or more operations of the fourth example.

In a sixth example, a computer-readable medium stores instructions that are operable when executed by a data processing apparatus to perform one or more operations of the fourth example.

Implementations of the fourth, fifth, or sixth example may include one or more of the following features. Computing the plurality of block coefficients can include obtaining the first block coefficient and the other integer based on reducing each of the integers modulo the first constant; converting the other integer from a first number system representation (e.g., binary in the example shown in FIGS. 7A-7C) to a second number system representation (e.g., ternary in the example shown in FIGS. 7A-7C); and obtaining the second block coefficient (e.g., $e_1$ in the example shown in FIGS. 7A-7C) based on the second number system representation of the other integer. Each of the plurality of constant can have the form $l_i^{e_i}$, where each $l_i$ represents a distinct prime less than the prime modulus (p), and each $e_i$ represents a respective integer value.

Implementations of the fourth, fifth, or sixth example may include one or more of the following features. The prime modulus can have the form $p=f(l_1^{e_1}, \ldots, l_k^{e_k})$ where each $l_i$ represents a distinct prime for $1<i\leq k$, each $e_i$ represents a respective integer value for $1<i\leq k$, the plurality of constants is the set of $l_i^{e_i}$ for $1<i\leq k$, the first constant is $l_1^{e_1}$, and the second constant is $l_2^{e_2}$; and computing the plurality of block coefficients can include performing at least one reduction modulo $l_i^{e_i}$ for $1<i\leq k$. The prime modulus can have the form $p=l_1^{e_1} \bullet \ldots \bullet l_k^{e_k} f \pm d$, where each $l_i$ represents a distinct prime for $1<i\leq k$, each $e_1$ represents a respective integer value for $1<i\leq k$, the plurality of constants is the set of $l_i^{e_i}$ for $1<i\leq k$, the first constant is $l_1^{e_i}$, the second constant is $l_2^{e_2}$, and f and d represent integer values; and computing the plurality of block coefficients can include performing at least one reduction modulo $l_i^{e_i}$ for $1<i\leq k$. The prime modulus can have the form $p=ab\pm d$, where the first constant is a, the second constant is b, the first constant a and the second constant b are relatively prime, and d represents an integer value.

Implementations of the fourth, fifth, or sixth example may include one or more of the following features. The prime modulus can have the form $p=2^{e_A}3^{e_B}f\pm d$, where the first constant is $2^{e_A}$, the second constant is $3^{e_B}$, and f and d represent integer values (e.g., in the example shown in FIGS. 7A-7C). The first integer (e.g., x in the example shown in FIGS. 7A-7C) of the pair integers can be reduced modulo the first constant $2^{e_A}$ in hardware by representing the first integer in binary memory; identifying a first block of the binary memory as a first remainder (e.g., $c_0$ in the example shown in FIGS. 7A-7C); and identifying a second block of the binary memory as a first quotient (e.g., $c_1$ in the example shown in FIGS. 7A-7C). The second integer (e.g., y in the example shown in FIGS. 7A-7C) of the pair integers can be reduced modulo the first constant $2^{e_A}$ in hardware by representing the second integer in binary memory; identifying a third block of the binary memory as a second remainder (e.g., $d_0$ in the example shown in FIGS. 7A-7C); and identifying a fourth block of the binary memory as a second quotient (e.g., $d_1$ in the example shown in FIGS. 7A-7C). The other integer (e.g., $c_0d_1+c_1d_0+c_1d_12^{e_A}$ in the example shown in FIGS. 7A-7C) is based on the first remainder, the first quotient, the second remainder and the second quotient. A representation of the other integer can be converted from a binary representation to a ternary representation, and the second block coefficient (e.g., $e_0$ in the example shown in FIGS. 7A-7C) can be obtained based on reducing the ternary representation of other integer modulo the second constant $3^{e_B}$. The ternary representation of the other integer can be reduced in hardware by: representing the other integer in ternary memory; identifying a first block of the ternary memory as a third remainder (e.g., $e_0$ in the example shown in FIGS. 7A-7C); and identifying a second block of the ternary memory as a third quotient (e.g., $e_1$ in the example shown in FIGS. 7A-7C). The third reminder can be identified as the second block coefficient ($e_0$).

Implementations of the fourth, fifth, or sixth example may include one or more of the following features. The prime modulus can have the form $p=2^{e_A}3^{e_B}f\pm d$, where the first constant is $2^{e_A}$, the second constant is $3^{e_B}$, and f and d represent integer values (e.g., in the example shown in FIGS. 7A-7C). Computing the plurality of block coefficients can include computing the first block coefficient $c_0d_0$, the second block coefficient $e_0$, and a third block coefficient $e_1$. The first block coefficient $c_0d_0$ can be a product of first and second remainders obtained by reducing, modulo the first constant $2^{e_A}$, each respective integer in the pair of integers. The second block coefficient $e_0$ can be a third remainder obtained by reducing the other integer modulo the second constant $3^{e_A}$.

Implementations of the fourth, fifth, or sixth example may include one or more of the following features. The prime modulus can have the form $p=2^{e_A}3^{e_B}f\pm d$, where the first constant is $2^{e_A}$, the second constant is $3^{e_B}$, and f and d represent integer values (e.g., in the example shown in FIGS. 7A-7C). The pair of integers includes a first integer (e.g., x in the example shown in FIGS. 7A-7C) and a second integer (e.g., y in the example shown in FIGS. 7A-7C), and computing the plurality of block coefficients can include computing a first remainder $c_0$ and a first quotient $c_1$ by reducing the first integer modulo the first constant $2^{e_A}$; computing a second remainder $d_0$ and a second quotient $d_1$ by reducing the second integer modulo the first constant $2^{e_A}$; computing the other integer $c_0d_1+c_1d_0+c_1d_12^{e_A}$; and computing a third remainder $e_0$ and a third quotient $e_1$ by reducing the other integer modulo the second constant $3^{e_B}$. Computing the reduced representation of the product can include computing a sum $c_0d_0+e_0+e_12^{e_A}$. Computing the reduced representation of the product can include, in response to a determination that the sum is greater than or equal to the prime modulus, subtracting the prime modulus from the sum.

Implementations of the fourth, fifth, or sixth example may include one or more of the following features. The prime modulus can have the form $p=2^{e_A}3^{e_B}f\pm d$, where the first constant is $3^{e_B}$, the second constant is $2^{e_A}$, and f and d represent integer values. The first integer of the pair integers can be reduced modulo the first constant $3^{e_B}$ in hardware by representing the first integer in ternary memory; identifying a first block of the ternary memory as a first remainder; and identifying a second block of the ternary memory as a first quotient. The second integer of the pair integers can be reduced modulo the first constant $3^{e_B}$ in hardware by representing the second integer in ternary memory; identifying a third block of the ternary memory as a second remainder; and identifying a fourth block of the ternary memory as a second quotient. The other integer (e.g., $c_0d_1+c_1d_0+c_1d_13^{e_B}$) can be computed based on the first remainder, the first quotient, the second remainder and the second quotient. A representation of the other integer can be converted from a ternary representation to a binary representation, and the second block coefficient (e.g., $e_0$) can be obtained based on reducing the binary representation of other integer modulo the second constant $2^{e_A}$. The binary representation of the other integer can be reduced in hardware by representing the other integer in binary memory; identifying a first block of the binary memory as a third remainder; and identifying a second block of the binary memory as a third quotient. The third reminder can be identified as the second block coefficient.

Implementations of the fourth, fifth, or sixth example may include one or more of the following features. The prime modulus can have the form $p=2^{e_A}3^{e_B}f\pm d$, where the first constant is $3^{e_B}$, the second constant is $2^{e_A}$, and f and d represent integer values. Computing the plurality of block coefficients can include computing the first block coefficient $c_0d_0$, the second block coefficient $e_0$, and a third block coefficient $e_1$. The first block coefficient $c_0d_0$ can be a product of first and second remainders obtained by reducing, modulo the first constant $3^{e_A}$, each respective integer in the pair of integers. The second block coefficient $e_0$ can be a third remainder obtained by reducing the other integer modulo the second constant $2^{e_A}$. The pair of integers includes a first integer and a second integer, and computing the plurality of block coefficients can include computing a first remainder $c_0$ and a first quotient $c_1$ by reducing the first integer modulo the first constant $3^{e_A}$; computing a second remainder $d_0$ and a second quotient $d_1$ by reducing the second integer modulo the first constant $3^{e_A}$; computing the other integer $c_0d_1+c_1d_0+c_1d_1 3^{e_A}$; and computing a third remainder $e_0$ and a third quotient $e_1$ by reducing the other integer modulo the second constant $2^{e_A}$. Computing the reduced representation of the product can include computing a sum $c_0d_0+e_0+e_1 3^{e_A}$.

Implementations of the fourth, fifth, or sixth example may include one or more of the following features. The cryptosystem can be a supersingular isogeny-based cryptosystem, and the prime modulus can represent a prime characteristic of a finite field defined by the supersingular isogeny-based cryptosystem. The prime modulus can have the form $p=l_A^{e_A}l_B^{e_B}f\pm 1$, where $l_A$ and $l_B$ are distinct prime integers and f is another integer, where the first constant is $l_A^{e_A}$ and the second constant is $l_B^{e_B}$. The cryptography protocol can be a supersingular isogeny-based key agreement protocol (e.g., SIDH or another isogeny-based key agreement protocol).

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method of performing a cryptography protocol, the method comprising:
   producing an integer during execution of a cryptography protocol defined by a cryptosystem;
   identifying a prime modulus, a first constant and a second, distinct constant defined by the cryptosystem, wherein the prime modulus is defined by the cryptosystem in terms of a plurality of constants comprising the first constant and the second constant;
   computing, by operation of one or more processors, a plurality of block coefficients to represent the integer in a block form, the plurality of block coefficients comprising:
      a first block coefficient obtained by a first modular reduction modulo the first constant; and
      a second block coefficient obtained by a second modular reduction modulo the second constant;
   computing, by operation of one or more processors, a reduced representation of the integer based on the plurality of block coefficients, wherein the reduced representation is less than the prime modulus; and
   using the reduced representation of the integer in the execution of the cryptography protocol in a communication system, wherein the execution of the cryptography protocol further comprises exchange of cryptographic correspondence over a communication network between a first computing device and a second computing device in the communication system.

2. The method of claim 1, wherein computing the plurality of block coefficients comprises:
   obtaining a quotient from the first modular reduction;
   converting the quotient from a first number system representation to a second number system representation; and
   applying the second modular reduction to the second number system representation of the quotient.

3. The method of claim 1, wherein each of the plurality of constants has the form $l_i^{e_i}$, where each $l_i$ represents a distinct prime less than the prime modulus, and each $e_i$ represents a respective integer value.

4. The method of claim 1, wherein:
   the prime modulus p has the form $p=f(l_1^{e_1}, \ldots, l_k^{e_k})$ where each $l_i$ represents a distinct prime for $1 \le i \le k$, each $e_i$ represents a respective integer value for $1 \le i \le k$, the plurality of constants is the set of $l_i^{e_i}$ for $1 \le i \le k$, the first constant is $l_1^{e_1}$, and the second constant is $l_2^{e_2}$; and
   computing the plurality of block coefficients comprises performing at least one reduction modulo $l_i^{e_i}$ for $1 \le i \le k$.

5. The method of claim 1, wherein:
   the prime modulus p has the form $p=l_1^{e_1} \bullet \ldots \bullet l_k^{e_k} f \pm d$, where each $l_i$ represents a distinct prime for $1 \le i \le k$, each $e_i$ represents a respective integer value for $1 \le i \le k$, the plurality of constants is the set of $l_i^{e_i}$ for $1 \le i \le k$, the first constant is $l_1^{e_1}$, the second constant is $l_2^{e_2}$, and f and d represent integer values; and
   computing the plurality of block coefficients comprises performing at least one reduction modulo $l_i^{e_i}$ for $1 \le i \le k$.

6. The method of claim 1, wherein the prime modulus p has the form $p=ab\pm d$, where the first constant is a, the second constant is b, the first constant a and the second constant b are relatively prime, and d represents an integer value.

7. The method of claim 1, wherein the prime modulus p has the form $p=2^{e_A}3^{e_B}f\pm d$, where the first constant is $2^{e_A}$, the second constant is $3^{e_B}$, and f and d represent integer values.

8. The method of claim 7, comprising performing the first modular reduction in hardware by:
   representing a first value in binary memory;
   identifying a first block of the binary memory as a first remainder; and
   identifying a second block of the binary memory as a first quotient,
   wherein the method comprises identifying the first remainder as the first block coefficient.

9. The method of claim 8, comprising converting the first quotient from a binary representation to a ternary representation, wherein the second modular reduction comprises reducing the ternary representation of the first quotient modulo the second constant $3^{e_B}$.

10. The method of claim 8, comprising performing the second modular reduction in hardware by:
    representing the first quotient in a ternary memory;
    identifying a first block of the ternary memory as a second remainder; and
    identifying a second block of the ternary memory as a second quotient,
    wherein the method comprises identifying the second remainder as the second block coefficient.

11. The method of claim 7, wherein:
    computing a plurality of block coefficients comprises computing the first block coefficient $c_0$, the second block coefficient $c_1$, a third block coefficient $c_2$, and a fourth block coefficient $c_3$;
    the first block coefficient $c_0$ comprises a first remainder obtained by performing the first modular reduction modulo the first constant $2^{e_A}$; and
    the second block coefficient $c_1$ comprises a second remainder obtained by performing the second modular reduction modulo the second constant $3^{e_A}$.

12. The method of claim 7, wherein:
    computing a plurality of block coefficients comprises:
        computing a first remainder $c_0$ and a first quotient $d_0$ by reducing the integer modulo the first constant $2^{e_A}$;
        computing a second remainder $c_1$ and a second quotient $d_1$ by reducing the first quotient $d_0$ modulo the second constant $3^{e_B}$; and
        computing a third remainder $c_2$ and a third quotient $c_3$ by reducing the second quotient $d_1$ modulo the first constant $2^{e_A}$; and
    computing the reduced representation of the integer based on the plurality of block coefficients comprises computing a sum $(c_0+c_2)+(c_1+c_3)2^{e_A}$.

13. The method of claim 12, wherein computing the reduced representation of the integer based on the plurality of block coefficients further comprises, in response to a determination that the sum is greater than or equal to the prime modulus, subtracting the prime modulus from the sum.

14. The method of claim 1, wherein the prime modulus p has the form $p=2^{e_A}3^{e_B}f\pm d$, where the first constant is $3^{e_B}$, the second constant is $2^{e_A}$, and f and d represent integer values.

15. The method of claim 14, comprising performing the first modular reduction in hardware by:
    representing a first value in ternary memory;
    identifying a first block of the ternary memory as a first remainder; and
    identifying a second block of the ternary memory as a first quotient,
    wherein the method comprises identifying the first remainder as the first block coefficient.

16. The method of claim 15, comprising converting the first quotient from a ternary representation to a binary representation, wherein the second modular reduction comprises reducing the binary representation of the first quotient modulo the second constant $2^{e_A}$.

17. The method of claim 15, comprising performing the second modular reduction in hardware by:
    representing the first quotient in a binary memory;
    identifying a first block of the binary memory as a second remainder; and
    identifying a second block of the binary memory as a second quotient,
    wherein the method comprises identifying the second remainder as the second block coefficient.

18. The method of claim 14, wherein:
    computing a plurality of block coefficients comprises computing the first block coefficient $c_0$, the second block coefficient $c_1$, a third block coefficient $c_2$, and a fourth block coefficient $c_3$;
    the first block coefficient $c_0$ comprises a first remainder obtained by performing the first modular reduction modulo the first constant $3^{e_A}$; and
    the second block coefficient $c_1$ comprises a second remainder obtained by performing the second modular reduction modulo the second constant $2^{e_A}$.

19. The method of claim 14, wherein:
    computing a plurality of block coefficients comprises:
        computing a first remainder $c_0$ and a first quotient $d_0$ by reducing the integer modulo the first constant $3^{e_B}$;
        computing a second remainder $c_1$ and a second quotient $d_1$ by reducing the first quotient $d_0$ modulo the second constant $2^{e_A}$; and
        computing a third remainder $c_2$ and a third quotient $c_3$ by reducing the second quotient $d_1$ modulo first constant $3^{e_B}$; and
    computing the reduced representation of the integer based on the plurality of block coefficients comprises computing a sum $(c_0+c_2)+(c_1+c_3)3^{e_B}$.

20. The method of claim 1, wherein:
    the cryptosystem comprises a supersingular isogeny-based cryptosystem, the prime modulus represents a prime characteristic of a finite field defined by the supersingular isogeny-based cryptosystem;
    the prime modulus p has the form $p=1_A^{e_A}1_B^{e_B}f\pm 1$, where $1_A$ and $1_B$ are distinct prime integers and f is another integer;
    the first constant is $1_A^{e_A}$; and
    the second constant is $1_B^{e_B}$.

21. The method of claim 20, wherein the cryptography protocol comprises a supersingular isogeny-based key agreement protocol.

22. The method of claim 1, further comprising storing the reduced representation of the integer in a ternary memory.

23. A non-transitory computer-readable medium storing instructions that are operable when executed by data processing apparatus to perform operations comprising:
    producing an integer during execution of a cryptography protocol defined by a cryptosystem;
    identifying a prime modulus, a first constant and a second, distinct constant defined by the cryptosystem, wherein the prime modulus is defined by the cryptosystem in terms of a plurality of constants comprising the first constant and the second constant;
    computing a plurality of block coefficients to represent the integer in a block form, the plurality of block coefficients comprising:
        a first block coefficient obtained by a first modular reduction modulo the first constant; and
        a second block coefficient obtained by a second modular reduction modulo the second constant;
    computing a reduced representation of the integer based on the plurality of block coefficients, wherein the reduced representation is less than the prime modulus; and
    using the reduced representation of the integer in the execution of the cryptography protocol in a communication system, wherein the execution of the cryptography protocol further comprises exchange of cryptographic correspondence over a communication network between a first computing device and a second computing device in the communication system.

24. The non-transitory computer-readable medium of claim 23, wherein computing the plurality of block coefficients comprises:
obtaining a quotient from the first modular reduction;
converting the quotient from a first number system representation to a second number system representation; and
applying the second modular reduction to the second number system representation of the quotient.

25. The non-transitory computer-readable medium of claim 23, wherein:
the cryptosystem comprises a supersingular isogeny-based cryptosystem, the prime modulus represents a prime characteristic of a finite field defined by the supersingular isogeny-based cryptosystem;
the prime modulus p has the form $p=1_A^{e_A}1_B^{e_B}f\pm1$, where $1_A$ and $1_B$ are distinct prime integers and f is another integer;
the first constant is $1_A^{e_A}$; and
the second constant is $1_B^{e_B}$.

26. The non-transitory computer-readable medium of claim 23, wherein each of the plurality of constants has the form $1_i^{e_i}$, where each $1_i$ represents a distinct prime less than the prime modulus, and each $e_i$ represents a respective integer value.

27. A system comprising:
one or more processors;
memory storing instructions that are operable when executed by the one or more processors to perform operations comprising:
producing an integer during execution of a cryptography protocol defined by a cryptosystem;
identifying a prime modulus, a first constant and a second, distinct constant defined by the cryptosystem, wherein the prime modulus is defined by the cryptosystem in terms of a plurality of constants comprising the first constant and the second constant;
computing a plurality of block coefficients to represent the integer in a block form, the plurality of block coefficients comprising:
a first block coefficient obtained by a first modular reduction modulo the first constant; and
a second block coefficient obtained by a second modular reduction modulo the second constant;
computing a reduced representation of the integer based on the plurality of block coefficients, wherein the reduced representation is less than the prime modulus; and
using the reduced representation of the integer in the execution of the cryptography protocol in a communication system, wherein the execution of the cryptography protocol further comprises exchange of cryptographic correspondence over a communication network between a first computing device and a second computing device in the communication system.

28. The system of claim 27, wherein computing the plurality of block coefficients comprises:
obtaining a quotient from the first modular reduction;
converting the quotient from a first number system representation to a second number system representation; and
applying the second modular reduction to the second number system representation of the quotient.

29. The system of claim 27, wherein:
the cryptosystem comprises a supersingular isogeny-based cryptosystem, the prime modulus represents a prime characteristic of a finite field defined by the supersingular isogeny-based cryptosystem;
the prime modulus p has the form $p=1_A^{e_A}1_B^{e_B}f\pm1$, where $1_A$ and $1_B$ are distinct prime integers and f is another integer;
the first constant is $1_A^{e_A}$; and
the second constant is $1_B^{e_B}$.

30. The system of claim 27, wherein each of the plurality of constants has the form $1_i^{e_i}$, where each $1_i$ represents a distinct prime less than the prime modulus, and each $e_i$ represents a respective integer value.

* * * * *